US009988896B2

(12) United States Patent
Switzer et al.

(10) Patent No.: US 9,988,896 B2
(45) Date of Patent: Jun. 5, 2018

(54) METHOD AND SYSTEM FOR TRANSMITTING A DATA FRAME OF AN ELECTROMAGNETIC TELEMETRY SIGNAL TO OR FROM A DOWNHOLE LOCATION

(71) Applicant: Evolution Engineering Inc., Calgary (CA)

(72) Inventors: David A. Switzer, Calgary (CA); Jili Liu, Calgary (CA); Mingdong Xu, Calgary (CA); Aaron W. Logan, Calgary (CA)

(73) Assignee: Evolution Engineering Inc., Calgary (CA)

( * ) Notice: Subject to any disclaimer, the term of this patent is extended or adjusted under 35 U.S.C. 154(b) by 38 days.

(21) Appl. No.: 14/925,643

(22) Filed: Oct. 28, 2015

(65) Prior Publication Data

US 2016/0047234 A1 Feb. 18, 2016

Related U.S. Application Data

(63) Continuation of application No. PCT/CA2014/050423, filed on May 2, 2014.
(Continued)

(51) Int. Cl.
*E21B 47/12* (2012.01)
*G08C 19/14* (2006.01)
(Continued)

(52) U.S. Cl.
CPC ............ *E21B 47/122* (2013.01); *G08C 19/14* (2013.01); *H04J 9/00* (2013.01); *H04L 7/06* (2013.01); *H04L 5/06* (2013.01)

(58) Field of Classification Search
CPC .......... E21B 44/00; E21B 47/00; E21B 47/12; E21B 49/08; E21B 47/091; E21B 7/046;
(Continued)

(56) References Cited

U.S. PATENT DOCUMENTS 8,251,160 B2 8/2012 Gopalan et al.
2003/0010492 A1 1/2003 Hill et al.
(Continued)

FOREIGN PATENT DOCUMENTS

WO 2014/153657 A1 10/2014

*Primary Examiner* — Mirza Alam
(74) *Attorney, Agent, or Firm* — Seed Intellectual Property Law Group LLP

(57) ABSTRACT

Methods, techniques, and systems for transmitting a data frame of an electromagnetic (EM) telemetry signal to or from a downhole location can be performed using multi-channel transmissions in which at least two different channels at two different frequencies are used to send a long header and the data frame. At least a portion of the long header is transmitted at a first frequency, and at least a portion of the data frame and any remaining portion of the long header not transmitted at the first frequency are transmitted at one or more additional frequencies different from each other and the first frequency. In one example, only two channels are used: one channel is used to transmit all of the long header, another channel is used to transmit all of the data frame, and either of the channels is used to transmit an identifier identifying the type of the data frame.

12 Claims, 36 Drawing Sheets

Related U.S. Application Data

(60) Provisional application No. 61/819,425, filed on May 3, 2013.

(51) Int. Cl.
  *H04J 9/00* (2006.01)
  *H04L 7/06* (2006.01)
  *H04L 5/06* (2006.01)

(58) Field of Classification Search
  CPC ......... G08C 19/14; H04L 5/06; G01V 11/002; G01V 3/18
  See application file for complete search history.

(56) References Cited

U.S. PATENT DOCUMENTS

| | | | |
|---|---|---|---|
| 2004/0085988 A1* | 5/2004 | Gardner | E21B 47/122 370/441 |
| 2008/0136665 A1* | 6/2008 | Aiello | E21B 47/12 340/856.3 |
| 2012/0099583 A1* | 4/2012 | Li | H04W 56/0085 370/350 |
| 2013/0192357 A1* | 8/2013 | Ramshaw | E21B 44/00 73/152.03 |
| 2014/0152457 A1* | 6/2014 | Nishisaka | E21B 47/12 340/853.2 |
| 2016/0076365 A1 | 3/2016 | Switzer et al. | |

* cited by examiner

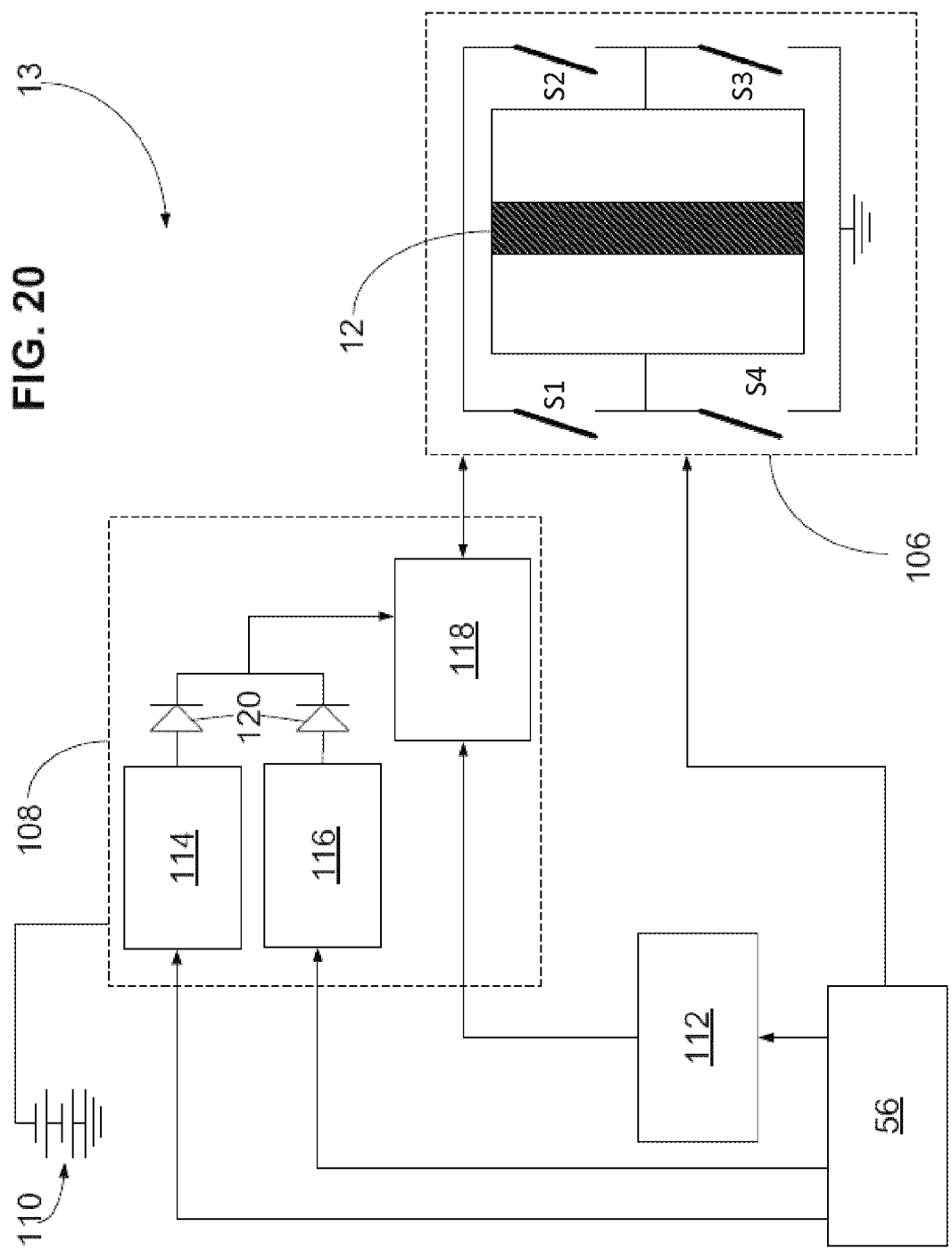

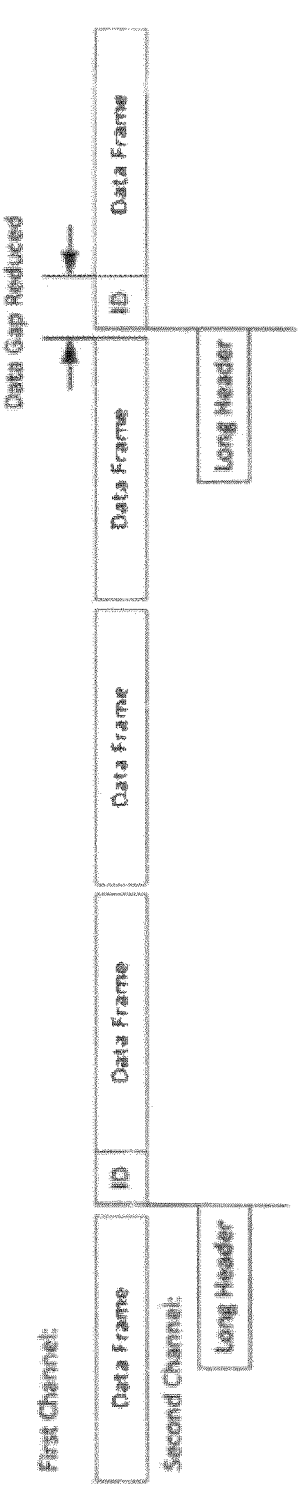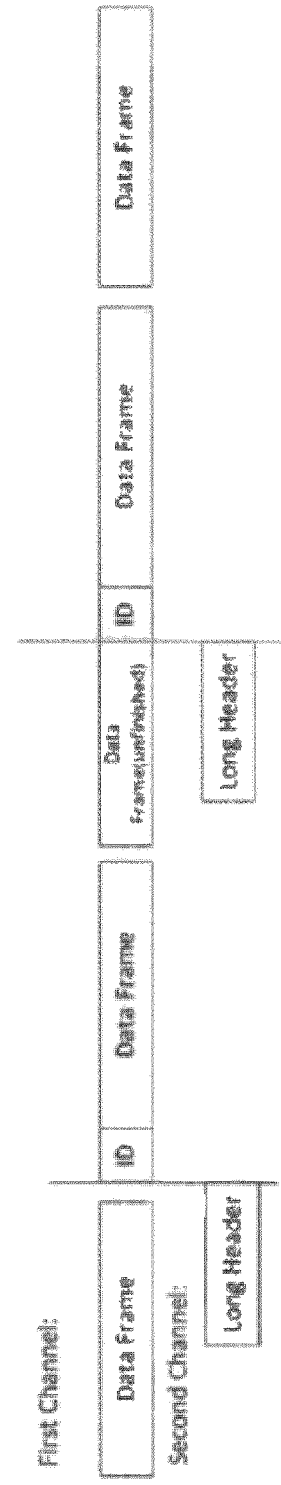
FIG. 22(a)
FIG. 22(b)

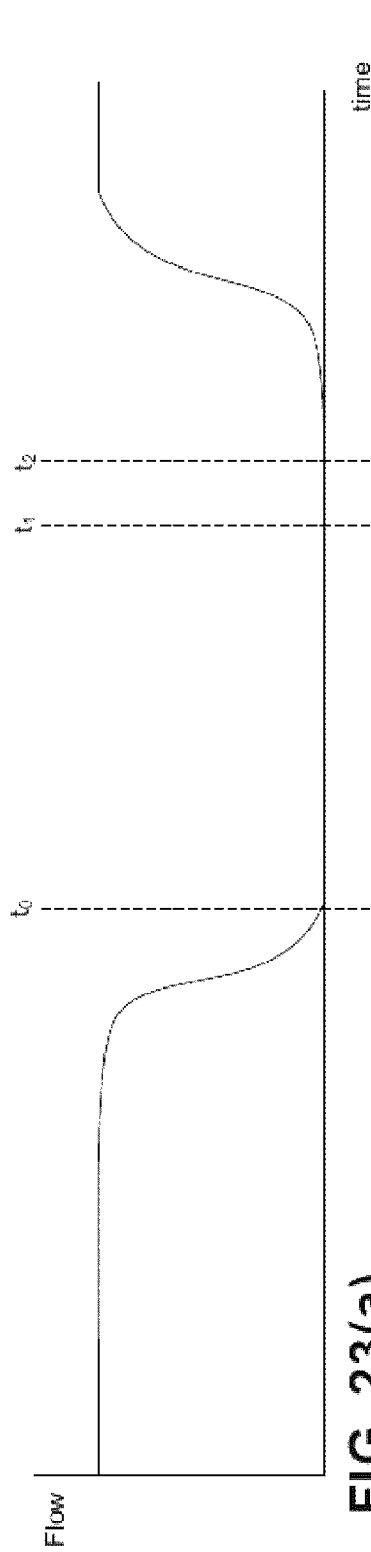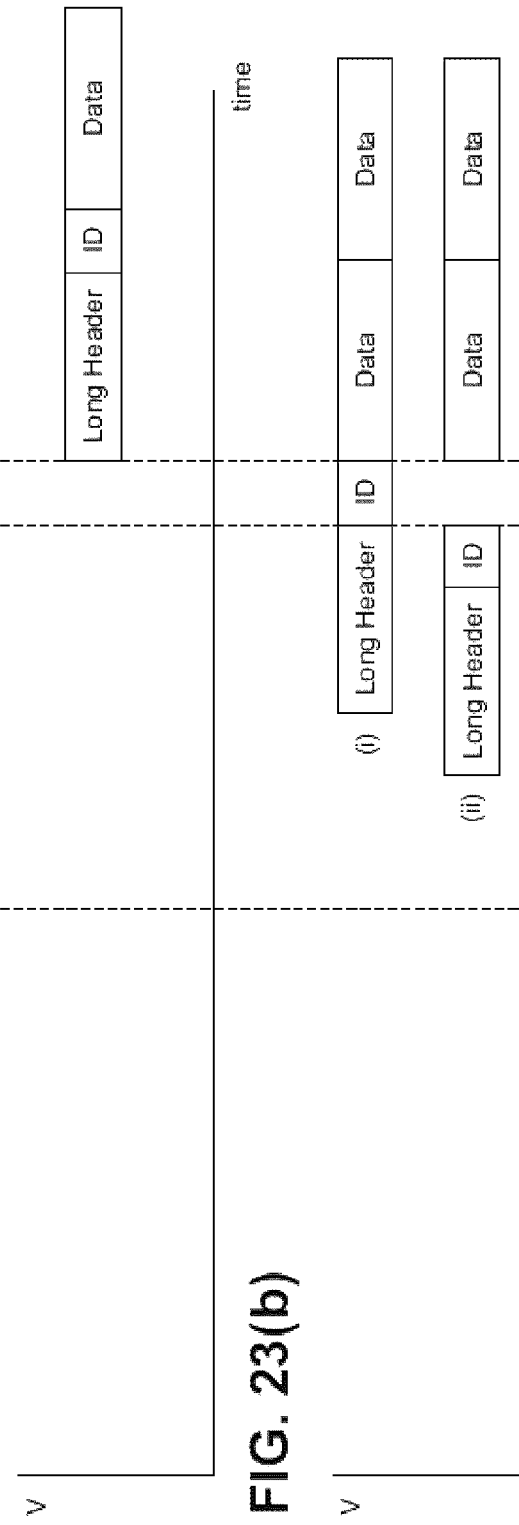
FIG. 23(a)
FIG. 23(b)
FIG. 23(c)

METHOD AND SYSTEM FOR TRANSMITTING A DATA FRAME OF AN ELECTROMAGNETIC TELEMETRY SIGNAL TO OR FROM A DOWNHOLE LOCATION

BACKGROUND

Technical Field

The present disclosure is directed at systems, methods, and techniques for transmitting a data frame of an electromagnetic telemetry signal to or from a downhole location.

Description of the Related Art

The recovery of hydrocarbons from subterranean zones relies on the process of drilling wellbores. The process includes drilling equipment situated at surface, and a drill string extending from the surface equipment to a below-surface formation or subterranean zone of interest. The terminal end of the drill string includes a drill bit for drilling (or extending) the wellbore. The process also involves a drilling fluid system, which in most cases uses a drilling "mud" that is pumped through the inside of piping of the drill string to cool and lubricate the drill bit. The mud exits the drill string via the drill bit and returns to surface carrying rock cuttings produced by the drilling operation. The mud also helps control bottom hole pressure and prevent hydrocarbon influx from the formation into the wellbore, which can potentially cause a blow out at surface.

Directional drilling is the process of steering a well from vertical to intersect a target endpoint or follow a prescribed path. At the terminal end of the drill string is a bottom-hole-assembly ("BHA") which comprises 1) the drill bit; 2) a steerable downhole mud motor of a rotary steerable system; 3) sensors of survey equipment used in logging-while-drilling ("LWD") and/or measurement-while-drilling ("MWD") to evaluate downhole conditions as drilling progresses; 4) means for telemetering data to surface; and 5) other control processes such as stabilizers or heavy weight drill collars. The BHA is conveyed into the wellbore by a string of metallic tubulars (i.e., drill pipe). MWD equipment is used to provide downhole sensor and status information to surface while drilling in a near real-time mode. This information is used by a rig crew to make decisions about controlling and steering the well to optimize the drilling speed and trajectory based on numerous factors, including lease boundaries, existing wells, formation properties, and hydrocarbon size and location. The rig crew can make intentional deviations from the planned wellbore path as necessary based on the information gathered from the downhole sensors during the drilling process. The ability to obtain real-time MWD data allows for a relatively more economical and more efficient drilling operation.

Some known MWD tools contain a sensor package to survey the wellbore and send data back to surface using a telemetry method known as electromagnetic (EM) telemetry. EM telemetry involves using an EM telemetry tool to generate EM waves carrying encoded data and transmit these waves from the wellbore through the surrounding formations, and using surface receiving equipment to detect and decode the waves at surface. The BHA metallic tubular is typically used as the dipole antennae for the EM telemetry tool by dividing the drill string into two conductive sections by an insulating joint or connector ("gap sub") typically placed within the BHA, with the bottom portion of the BHA and the drill pipe each forming an antennae for the dipole antennae. In EM telemetry systems, a very low frequency alternating current is driven across the gap sub. The sub is electrically isolated ("nonconductive") at the insulating joint, effectively creating an insulating break ("gap") between the portion of the drill string below the gap and the portion above the gap, which extends all the way up to the surface. The lower part below the gap typically is set as a ground but the polarity of the members can be switched. The low frequency AC voltage and magnetic reception is controlled in a timed/coded sequence to energize the earth and create a measurable voltage differential between the surface ground and the top of the drill string. The EM signal which originated across the gap is detected at surface and measured as a difference in the electric potential from the drill rig to various surface grounding rods located about the drill site.

Typically, a sinusoidal waveform is used as a carrier signal for the telemetry data. The MWD tool comprises a downhole modulator which can use one of a number of encoding or modulation schemes to encode the telemetry data onto a carrier waveform. The three key parameters of a periodic waveform are its amplitude ("volume"), its phase ("timing") and its frequency ("pitch"). Any of these properties can be modified in accordance with a low frequency signal to obtain a modulated signal. Frequency-shift keying ("FSK") is a frequency modulation scheme in which digital information is transmitted through discrete frequency changes of a carrier wave. The simplest FSK is binary FSK ("BFSK"). BFSK uses a pair of discrete frequencies to transmit binary information. Amplitude shift keying ("ASK") conveys data by changing the amplitude of the carrier wave; phase-shift keying ("PSK") conveys data by changing, or modulating, the phase of a reference signal (the carrier wave). It is known to combine different modulation techniques to encode telemetry data.

The choice of modulation scheme uses a finite number of distinct signals to represent digital data. PSK uses a finite number of phases, wherein each phase is assigned a unique pattern of binary digits, or "symbols", and wherein the symbols together form a defined symbol set. Usually, each phase encodes an equal number of bits. Each pattern of bits forms the symbol that is represented by the particular phase. A surface demodulator contains the same symbol set used by the downhole modulator, and determines the phase of the received signal and maps it back to the symbol it represents, thus recovering the original data.

BRIEF SUMMARY

According to a first aspect, there is provided a method for transmitting a data frame of an electromagnetic (EM) telemetry signal to or from a downhole location. The method comprises transmitting at least a portion of a long header at a first frequency, wherein the EM telemetry signal comprises the long header and the data frame; and transmitting at least a portion of the data frame and any remaining portion of the long header not transmitted at the first frequency at one or more additional frequencies different from each other and from the first frequency, wherein the first frequency and the one or more additional frequencies are sufficiently separated to permit demodulation of the portion of the long header transmitted at the first frequency and the portion of the data frame and any remaining portion of the long header transmitted at the one or more additional frequencies.

All of the long header may be transmitted at the first frequency and all of the data frame may be transmitted at a second frequency.

In one aspect, $$f'\left(1 + \frac{1}{c'}\right) \le f\left(1 - \frac{1}{c}\right),$$

wherein f is one of the first and second frequencies, f' is the other of the first and second frequencies, f>f', c is cycles per bit transmitted at f, and c' is cycles per bit transmitted at f'. Additionally or alternatively, c may equal c'.

f' may be the first frequency and f may be the second frequency.

The method may further comprise transmitting an identifier (ID), which varies with the content of the data frame, at the first or second frequencies.

All of the ID and of the data frame may be transmitted at the second frequency.

The long header may be transmitted prior to the ID.

At least a portion of the long header may be transmitted simultaneously with a previous data frame.

All or less than all of the previous data frame may be transmitted prior to transmission of the ID.

The previous data frame and the long header may complete transmitting simultaneously.

At least a portion of the long header may be transmitted simultaneously with the ID.

The long header may complete transmitting during transmission of the data frame.

All of the long header and the ID may be transmitted at the first frequency and all of the data frame may be transmitted at the second frequency.

All or less than all of a previous data frame may be transmitted prior to transmission of the data frame.

The previous data frame and the ID may complete transmitting simultaneously.

The frame may be transmitted to the downhole location, and the method may further comprise pausing between transmitting the ID and the data frame.

The frame may be transmitted from the downhole location and sent to surface.

The data frame may comprise data obtained during a survey and transmission of the long header may commence during an idle period immediately prior to acquiring the survey.

According to another aspect, there is provided a method for transmitting a data frame of an electromagnetic (EM) telemetry signal from a downhole location to surface. The method comprises: during an idle period following cessation of pumping drilling fluid, transmitting at least a portion of a long header, wherein the EM telemetry signal comprises the long header and the data frame; acquiring a survey during a survey acquisition period that immediately follows the idle period, wherein the data frame comprises results of the survey; encoding results of the survey as the data frame; and transmitting the data frame and any portion of the long header not transmitted during the idle period.

The method may further comprise transmitting an identifier (ID), which varies with the content of the data frame.

All of the long header may be transmitted during the idle period.

All of the ID may be transmitted during the idle period.

According to another aspect, there is provided a non-transitory computer readable medium having encoded thereon statements and instructions to cause a processor to perform any of the aspects of the methods described above.

According to another aspect, there is provided a downhole telemetry tool for transmitting a frame of an electromagnetic (EM) telemetry signal from a downhole location. The tool comprises a gap sub assembly; an EM carrier frequency signal generator for generating an EM carrier wave across an electrically isolated gap of the gap sub assembly; and an electronics subassembly communicative with the signal generator and comprising a downhole processor and a memory containing an encoder program code executable by the downhole processor to perform any of the aspects of the methods described above.

This summary does not necessarily describe the entire scope of all aspects. Other aspects, features and advantages will be apparent to those of ordinary skill in the art upon review of the following description of specific embodiments.

BRIEF DESCRIPTION OF THE SEVERAL VIEWS OF THE DRAWINGS

In the accompanying drawings, which illustrate one or more exemplary embodiments:

FIG. 20 is a block diagram of an EM signal transmitter of the EM telemetry system, according to one embodiment.

FIGS. 22(a)-(d) depict four bitstreams transmitted using multiple channels, according to four exemplary embodiments.

FIG. 23(a) depicts mud flow vs. time during a drilling operation, while FIGS. 23(b) and 23(c) depict exemplary bitstreams transmitted during the drilling operation.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

An EM signal generated by a downhole EM signal transmitter needs to have a sufficient strength that the signal is still detectable at surface by a surface EM signal receiver despite considerable attenuation of the transmitted signal as the signal travels long distances through the earth's formations.

The embodiments described herein generally relate to a multi-channel EM telemetry system which comprise a downhole EM telemetry tool that combines multiple EM waveforms each representing a separate channel of telemetry data into a combined waveform and transmits this combined waveform to surface in a single EM transmission, and which also comprises a surface receiver that receives the combined waveform and decodes the waveform into the separate channels of telemetry data. It is expected that a high overall efficiency of data transmission can be achieved by sending multiple channels of telemetry data in a single EM transmission comprising the combined waveform.

Figure 1:
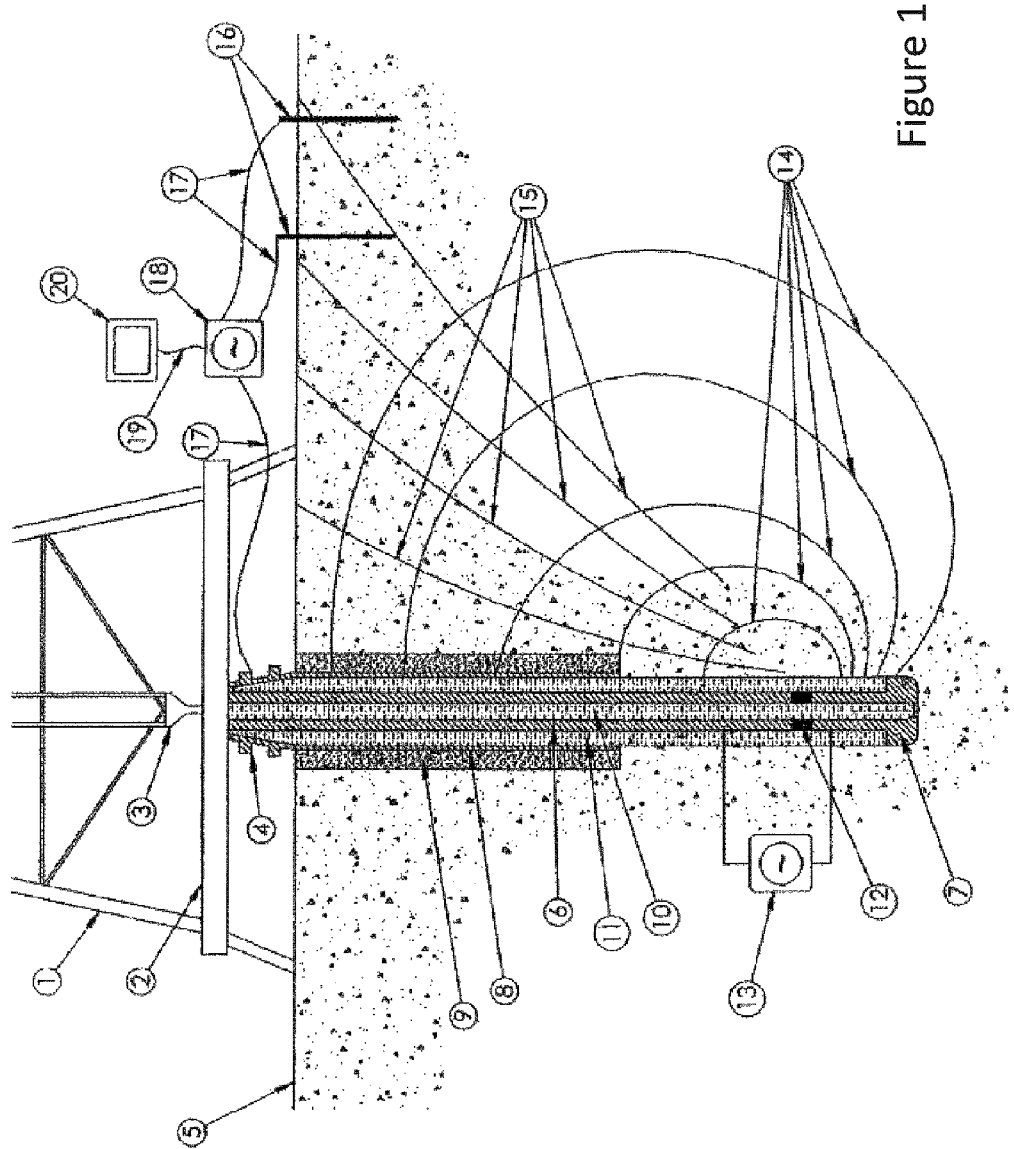
FIG. 1 is schematic side view of a multi-channel EM telemetry system in operation, according to one embodiment.

Referring to FIG. 1, there is shown a schematic representation of an EM telemetry system in which various embodiments can be employed. Downhole drilling equipment including a derrick 1 with a rig floor 2 and draw works 3 facilitates rotation of the drill pipe 6 into the ground 5. The drill pipe 6 is enclosed in casing 8 which is fixed in position by casing cement 9. Bore drilling fluid 10 is pumped down drill pipe 6 and through an electrically isolating gap sub assembly 12 to drill bit 7. Annular drilling fluid 11 is then pumped back to the surface and passes through a blow out preventer ("BOP") 4 positioned above the ground surface. The gap sub assembly 12 may be positioned at the top of the BHA, with the BHA and the drill pipe 6 each forming antennae for the dipole antennae. The gap sub assembly 12 is electrically isolated ("nonconductive") at its center joint effectively creating an insulating break, known as a gap, between the bottom of the drill string with the BHA and the larger top portion of the drill string that includes the rest of the drill pipe 6 up to the surface. A very low frequency alternating electrical current 14 is generated by an EM signal transmitter 13 and driven across the gap sub assembly 12 to generate discrete pulses which carry encoded telemetry data ("EM telemetry transmission"). The low frequency AC voltage and magnetic reception is controlled in a timed/coded sequence to energize the earth and create an electrical field 15. Communication cables 17 transmit the measurable voltage differential from the top of the drill string and various surface grounding rods 16 located about the drill site to surface receiving and processing equipment 18 which receives and processes the EM telemetry transmission. The grounding rods 16 are generally randomly located on site with some attention to site operations and safety. The EM telemetry transmission is decoded and a receiver box communication cable 19 transmits the data received to a computer display 20 after decoding, thereby providing measurement while drilling information to the rig operator.

Figure 2:
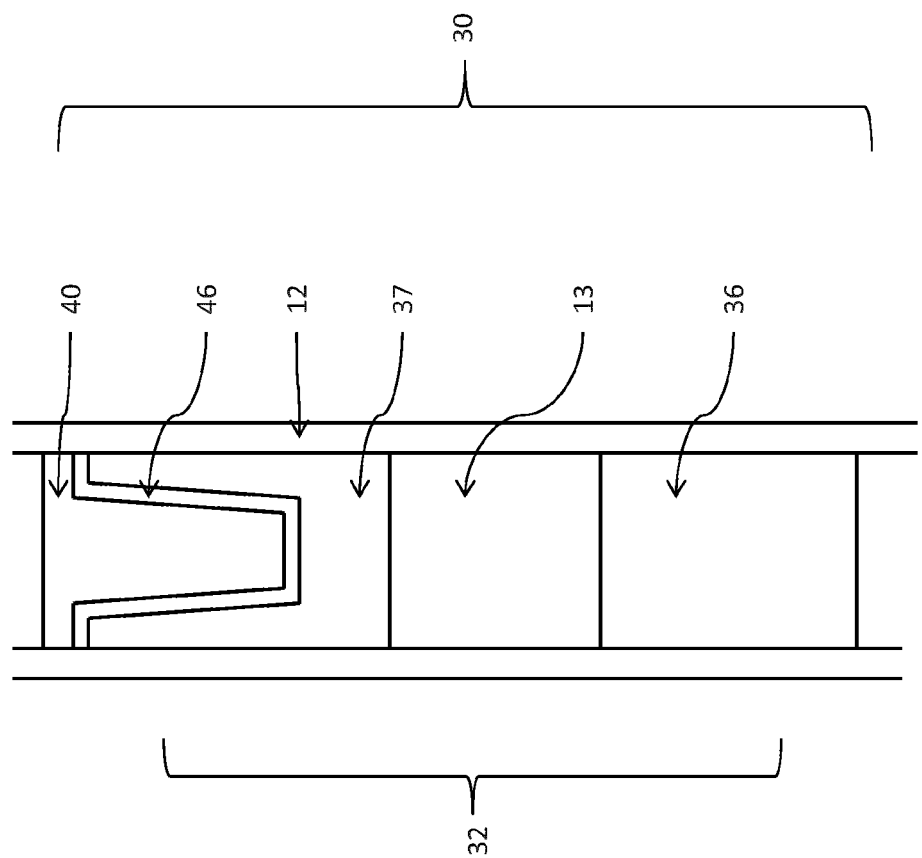
FIG. 2 is a schematic side view of components of a downhole EM telemetry tool of the EM telemetry system according to one embodiment.

Referring now to FIG. 2, an EM telemetry system 30 according to one embodiment comprises a multi-channel downhole EM telemetry tool 32 and the surface receiving and processing equipment 18 (not shown in FIG. 2). The EM telemetry tool 32 generally comprises the gap sub assembly 12, the EM signal transmitter 13, and an electronics subassembly 36. The electronics subassembly 36 houses sensors for taking downhole measurements as well as a processor and memory which contains program code executable by the processor to encode the sensor measurements into multiple channels of telemetry data each with a separate EM waveform, combine the separate EM waveforms into a combined waveform, and send control signals to the EM signal transmitter 13 to transmit the combined waveform to surface. The surface receiving and processing equipment 18 comprise equipment to receive the combined waveform, filter and process the waveform, and decode the waveform into the telemetry data.

The gap sub assembly 12 comprises an electrically conductive female member 37 comprising a female mating section and an electrically conductive male member 40 comprising a male mating section. The male mating section is matingly received within the female mating section and electrically isolated therefrom by an electrical isolator 46. The electrical isolator 46 comprises electrical insulating material that is positioned in between the male and female mating sections. The electrical isolator 46 thereby electrically isolates the male member 40 from the female member 37, and the male member 40, female member 37 and electrical isolator 46 together function as the gap sub assembly 12 for EM telemetry.

Figure 3:
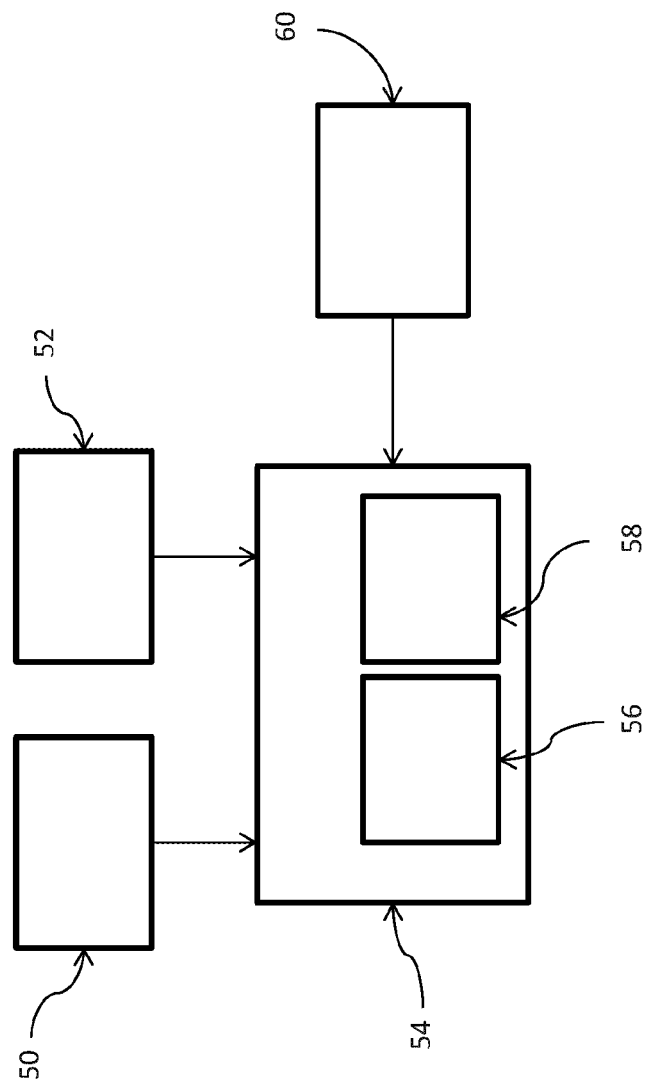
FIG. 3 is a schematic block diagram of components of an electronics subassembly of the downhole EM telemetry tool.

Referring to FIG. 3, the electronics subassembly 36 includes sensors for taking various downhole measurements, and encoding and processing equipment for encoding the measurements and other information (collectively "telemetry data") into a telemetry signal for transmission by the EM signal transmitter 13. More particularly, the electronics subassembly 36 comprises a tubular housing (not shown) and the following components housed inside the housing: a directional and inclination (D&I) sensor module 50; drilling conditions sensor module 52; a main circuit board 54 containing a master processing unit (MPU or otherwise referred to as the "downhole processor") 56 having an integrated (shown) or separate (not shown) data encoder, a memory 58 having stored thereon program code executable by the downhole processor 56, one or more power amplifiers (not shown); and a battery stack 60. The downhole processor 56 can be any suitable processor known in the art for EM tools, and can be for example, a dsPIC33 series MPU. The power amplifiers can be, for example, a power MOSFET H-bridge design configured to transmit data.

The D&I sensor module 50 comprises three axis accelerometers, three axis magnetometers and associated data acquisition and processing circuitry. Such D&I sensor modules are well known in the art and thus are not described in detail here.

The electronics subassembly 36 includes sensors and circuitry for taking various measurements of borehole parameters and conditions including gamma, temperature, pressure, shock, vibration, RPM, and directional parameters. Such sensors and circuitry are also well known in the art and thus are not described in detail here.

The main circuit board 54 can be a printed circuit board with electronic components soldered on the surface of the board 54. The main circuit board 54 and the sensor modules 50, 52 are secured on a carrier device (not shown) which is fixed inside the electronics subassembly housing by end cap structures (not shown). The sensor modules 50, 52 are each electrically communicative with the main circuit board 54 and send measurement data to the downhole processor 56.

Figure 4:
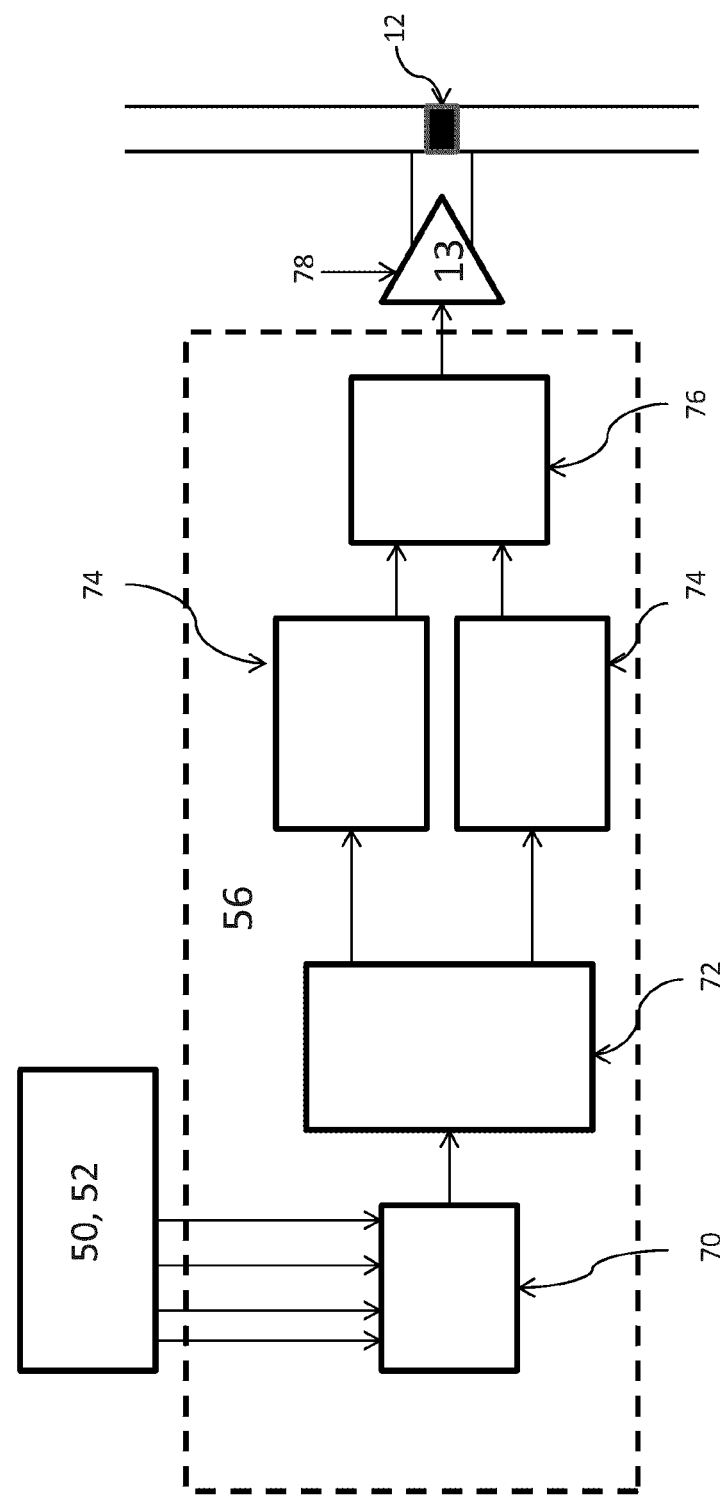
FIG. 4 is a schematic block diagram of the components of the downhole EM telemetry tool.

As will be described below, the memory 58 contains encoder program code that can be executed by the downhole processor 56 to perform a method of encoding and transmitting a multi-channel EM telemetry signal using a combined waveform that is a combination of two or more separate waveforms each representing a separate telemetry channel. Referring to FIG. 4, the downhole processor 56 reads raw measurement data from the sensor modules 50, 52 and encodes this raw data into an encoded digital bitstream (step 70). Then the downhole processor 56 separates the encoded digital bitstream into two or more separate digital bitstreams, which in the embodiment shown in FIG. 4 comprises a first bitstream and a second bitstream (step 72). Then, the downhole processor 56 converts each digital bitstream into a separate waveform, namely a first waveform and a second waveform (otherwise referred to as "first telemetry channel" and "second telemetry channel"); this conversion involves using a selected digital modulation technique to modulate the waveforms, wherein the frequency of each waveform being modulated is assigned a unique value or a unique, non-overlapping range of values, i.e., a value or range of values that is different than the value or range of values of the corresponding parameter(s) of the other waveforms (step 74). Then the downhole processor 56 combines each separate waveform into a combined waveform (step 76), and then sends a control signal to the signal transmitter 13 to transmit an EM telemetry signal comprising the combined waveform (otherwise referred to as "carrier wave") across the gap sub 12 (step 78).

Various digital modulation techniques known in the art can be used to encode each separate waveform, such as ASK, PSK, FSK, binary phase-shift keying (BPSK), quadrature phase shift keying (QPSK) or any combination of these or other individual modulation techniques as is known in the art. As one (or more) of the amplitude, frequency and phase of the separate waveforms is set at a unique value, the plurality of separate waveforms encoded by one or more of these techniques can be superimposed to form one combined waveform (carrier wave) for transmission to surface. As a result, one EM signal comprising the carrier wave composed of two or more telemetry channels can be transmitted to surface.

Figure 8:
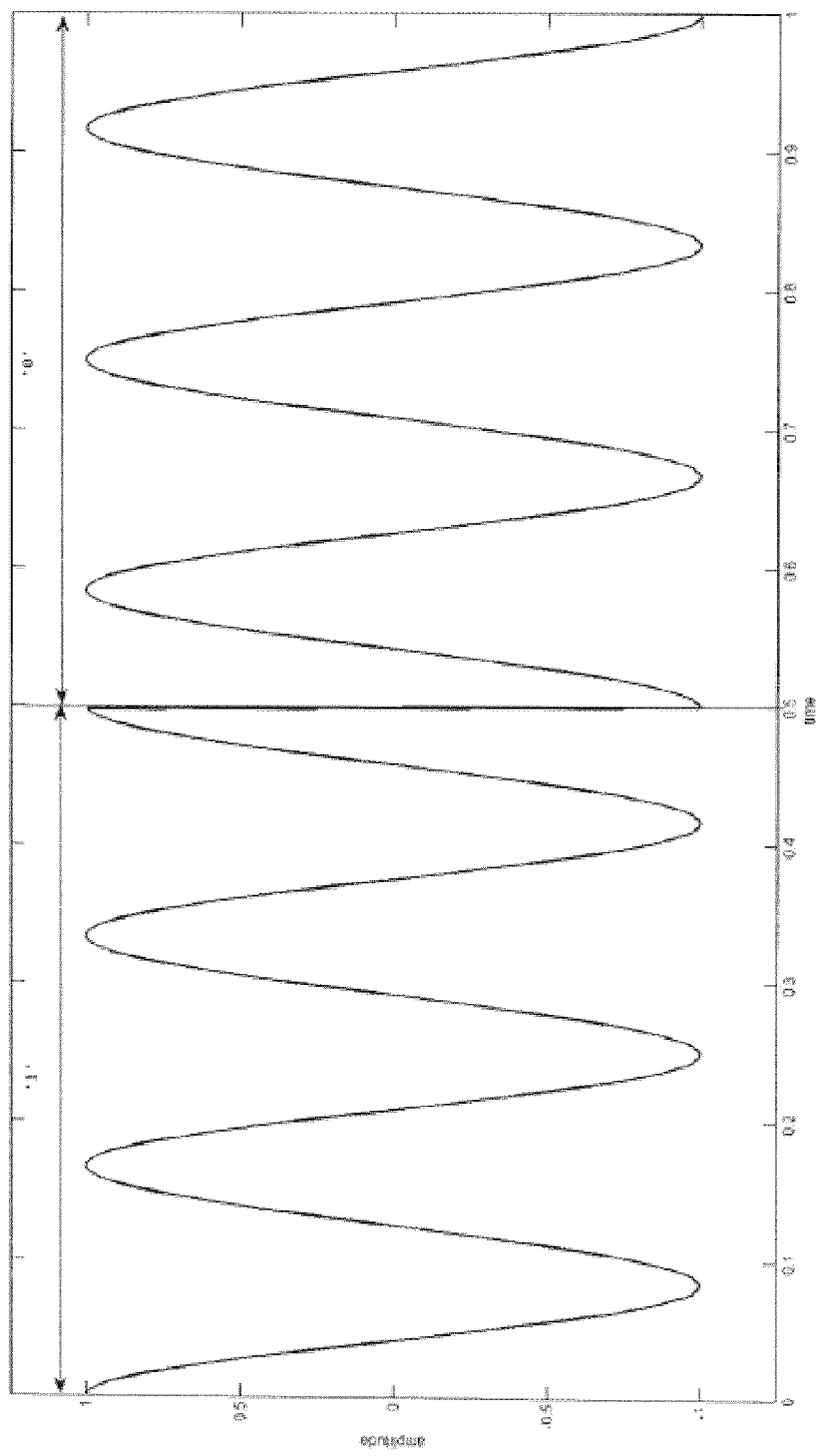
FIG. 8 is a graph of a first downhole waveform of a first telemetry signal.
Figure 9:
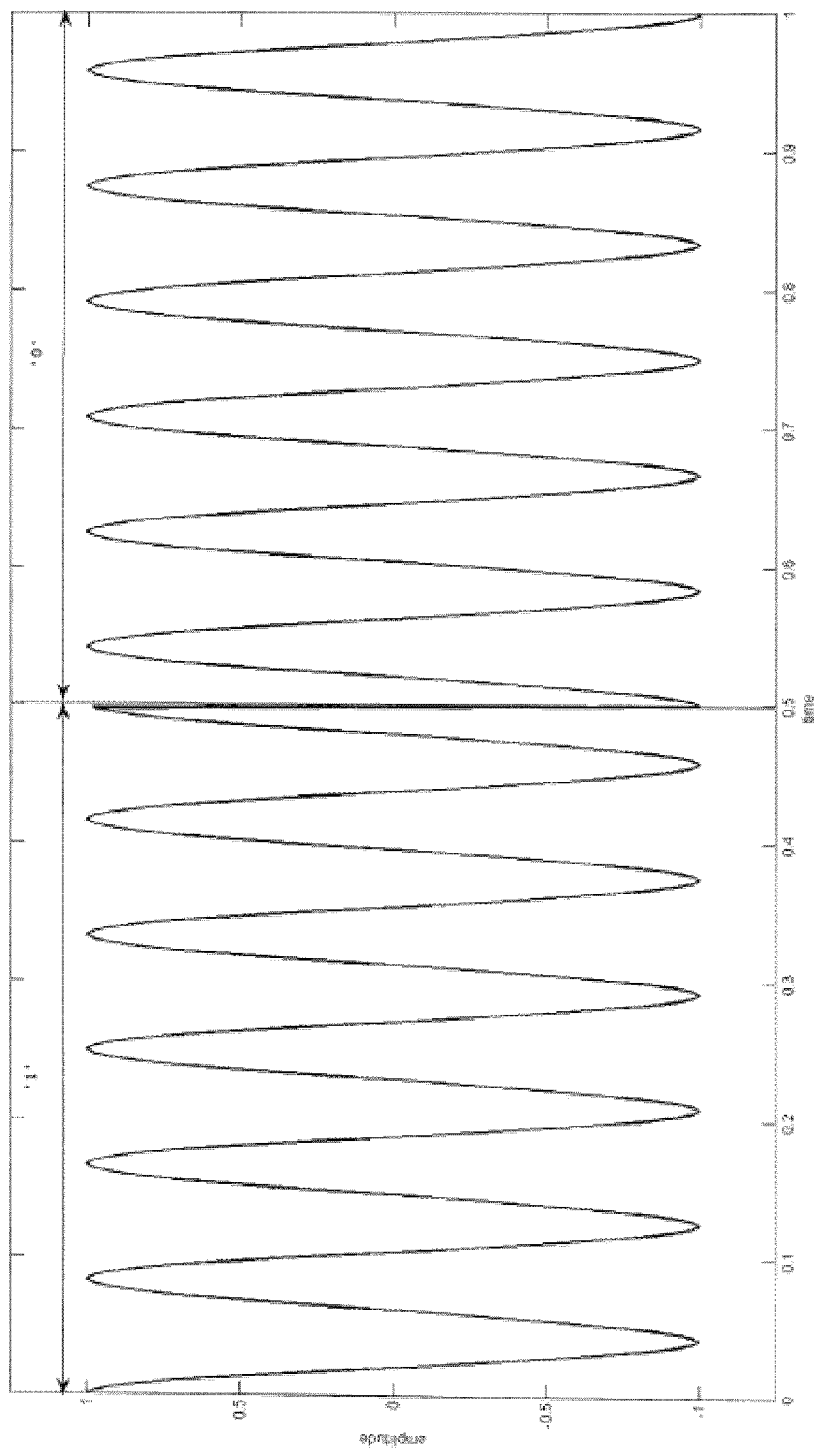
FIG. 9 is a graph of a second downhole waveform of a second telemetry signal.
Figure 10:
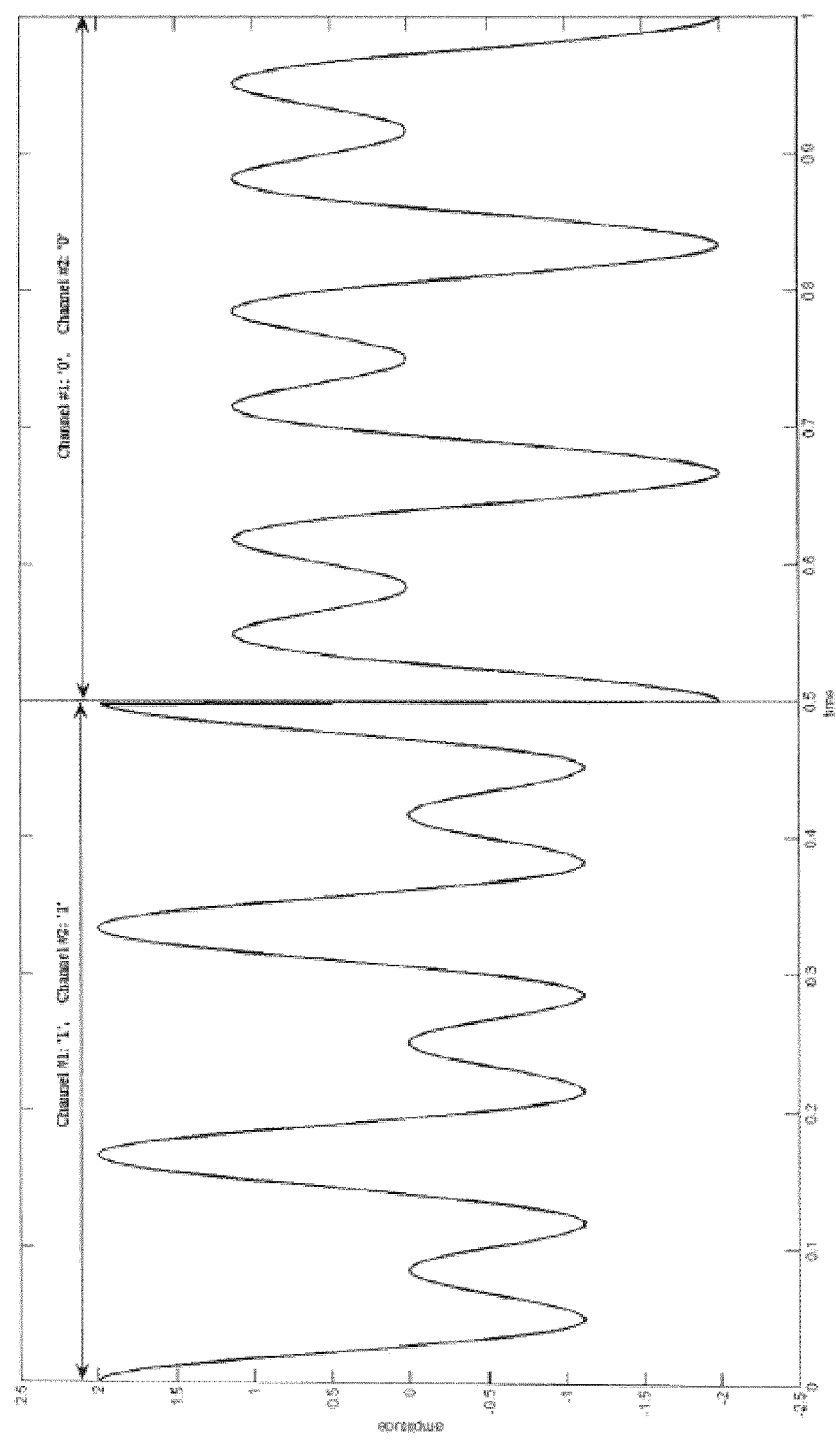
FIG. 10 is a graph of a multi-channel EM telemetry signal that is the combination of the first and second downhole waveforms, as transmitted by the downhole EM telemetry tool.

In one example and referring to FIGS. 8 to 10, each separate waveform can be modulated using BPSK with different frequencies then combined into the combined waveform. FIG. 8 shows a first downhole waveform for the first channel, having a maximum amplitude of 1.0, a frequency of 6 Hz, and a phase shift of 180 degrees at time 0.5. FIG. 9 shows a second downhole waveform for the second channel, having a maximum amplitude of 1.0, a frequency of 12 Hz, and a phase shift of 180 degrees at time 0.5. FIG. 10 shows a combined downhole waveform representing the combination of the first and second downhole waveforms.

In another example (not shown), each separate waveform can be modulated using ASK with different frequencies. In this modulation technique, the power amplifiers can be used to modulate the amplitudes of each waveform instead of or in addition to the processor performing a digital ASK modulation.

Referring now to FIG. 20, there is shown a block diagram of the EM signal transmitter 13 communicatively coupled to the gap sub 12. The EM signal transmitter 13 is configured to generate bipolar EM pulses to carry the telemetry signal encoded by the modulation techniques discussed above. Bipolar EM pulses mean pulses that have either a positive or negative amplitude. The EM signal transmitter 13 comprises an H-bridge circuit 106 which is used to switch the polarity of the EM pulse, a step-up/step-down voltage regulator 108, a battery 110, and a signal generator 112. The voltage regulator 108 comprises separate step-up and step-down voltage regulators 114, 116, a pulse width modulation driver ("PWM driver") 118, and diodes 120 that electrically connect the outputs of these voltage regulators 114, 116 to the input of the PWM driver 118. The output of the PWM driver 118 is used as the output of the voltage regulator 108. The H-bridge circuit 106 enables a voltage to be applied across a load in either direction, and comprises four switches of which one pair of switches can be closed to allow a voltage to applied in one direction ("positive pathway"), and another pair of switches can be closed to allow a voltage to be applied in a reverse direction ("negative pathway"). In the H-bridge circuit 106 of the EM signal transmitter 13, switches S1, S2, S3, S4 are arranged so that the part of the circuit with switches S1 and S4 is electrically coupled to one side of the gap sub 12 ("positive side"), and the part of the circuit with switches S2 and S3 are electrically coupled to the other side of the gap sub 12 ("negative side"). Switches S1 and S3 can be closed to allow a voltage to be applied across the positive pathway of the gap sub 12 to generate a positive polarity pulse, and switches S2 and S4 can be closed to allow a voltage to be applied across the negative pathway of the gap sub 12 to generate a negative polarity pulse.

One end of the H-bridge circuit 106 is grounded and the other end is electrically coupled to the output of the voltage regulator 108. The voltage regulator 108 in turn is electrically coupled to the battery 110 as well as to the signal generator 112 and the processor 56. More specifically, the output of the signal generator 112 is electrically coupled to the input of the PWM driver 118, and the processor 56 outputs control signals to the step-up regulator 114 and the step-down regulator 116 to control which one is active at any given time. As described in further detail below, by using the step-up and step-down voltage regulators 114,116, the voltage regulator 108 is able to adjust the strength of the EM transmission to surface.

The signal generator 112 is communicative with the downhole processor 56, and serves to receive the encoded telemetry signal from the downhole processor 56, and determine the appropriate control signals to send to the voltage regulator 108. In particular, the signal generator 112 will send voltage output and timing control signals to the voltage regulator 108 to output a voltage at a certain voltage level and timing (or at the fixed voltage level if there is no ASK). The processor 56 sends polarity control signals to the H-bridge circuit 106 to close the appropriate switches to create a positive polarity EM pulse or a negative polarity EM pulse in conjunction with the output of the signal generator 112. When the modulation technique involves timing shift keying, the signal generator 112 and the processor 56 are configured to send the control signals at a specific timing interval pattern in accordance with the timing shift keying modulation scheme.

The signal generator 112 is capable of generating a pulse of different widths (frequencies). For example, the signal generator can generate a wide pulse using a very low frequency, e.g., below 2 Hz, and in particular, between 0.5 and 0.25 Hz. Transmitting at such low frequencies can be useful to take advantage of a natural bias towards lower frequencies in the Earth.

Figure 5:
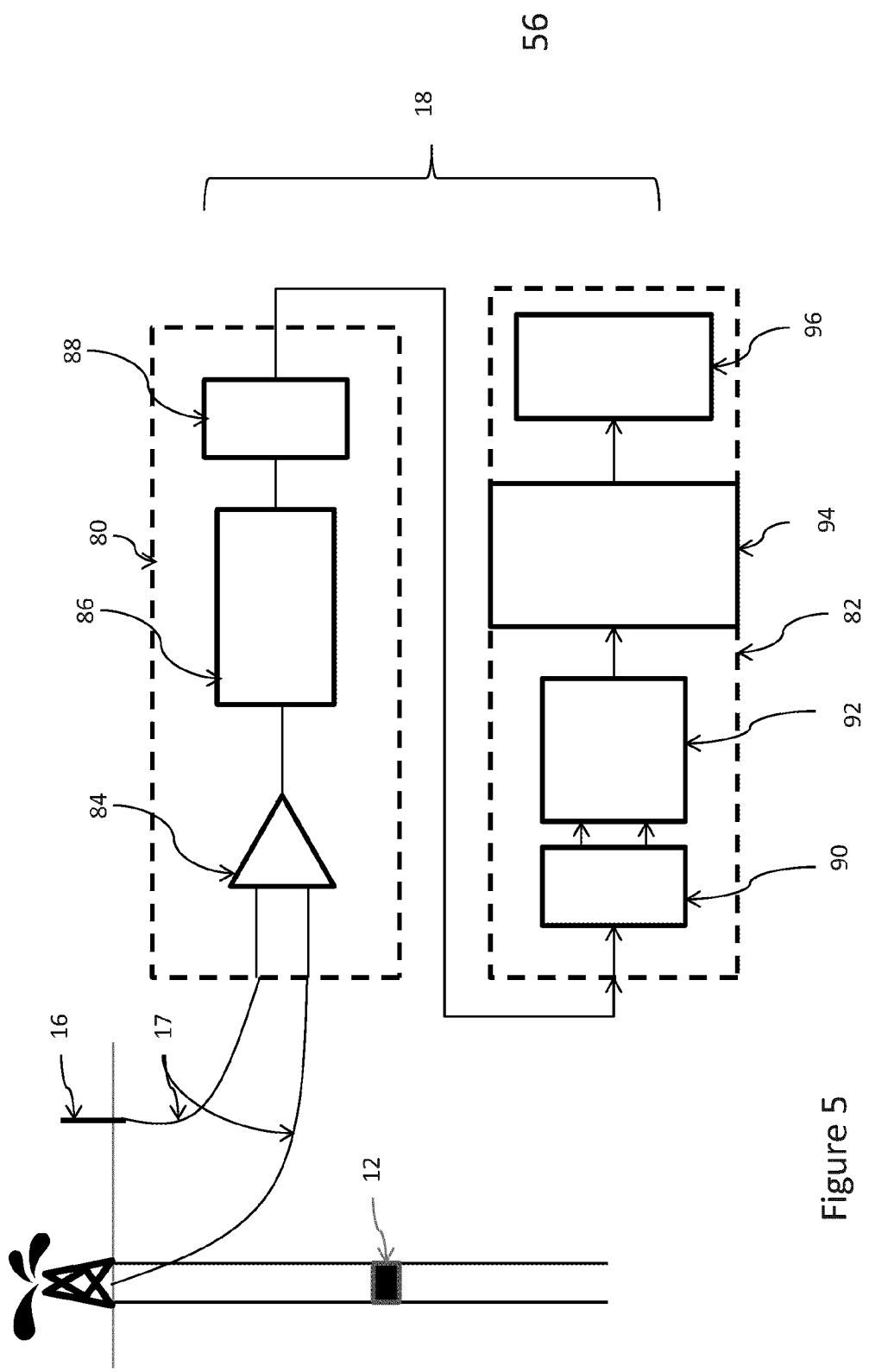
FIG. 5 is a schematic block diagram of surface components of the multi-channel EM telemetry system according to one embodiment.
Figure 11:
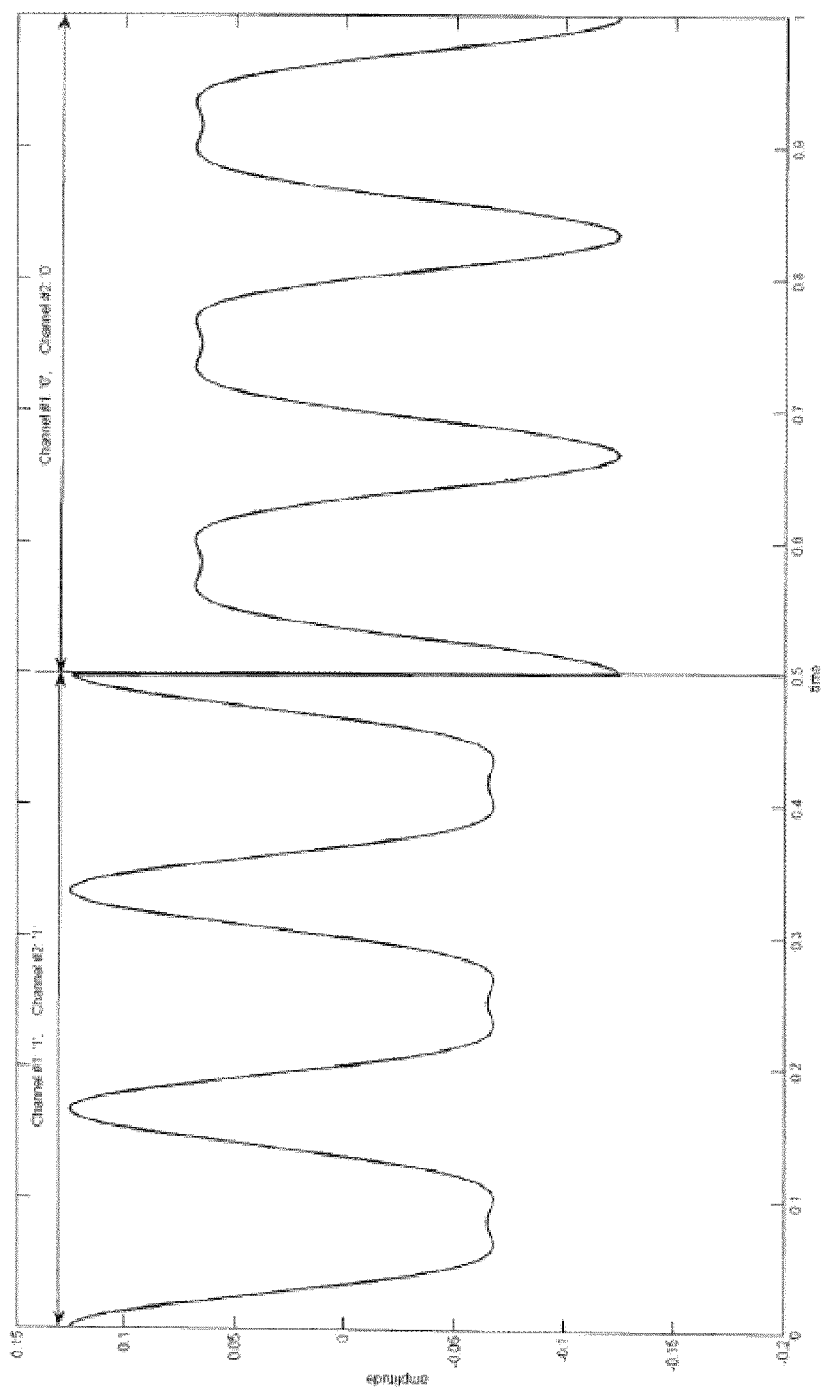
FIG. 11 is a graph of the multi-channel EM telemetry signal as received by the surface components.

Referring now to FIG. 5, the surface receiving and processing equipment 18 receives the carrier wave and decodes the combined waveform to recover each separate telemetry channel; the carrier wave sent by the EM telemetry tool 32 shown in FIG. 10 will have attenuated as the carrier wave travels through the Earth, and FIG. 11 shows the carrier wave as received by surface receiving and processing equipment 18. The telemetry channels can then be converted back into the measurement data for use by the operator. As will be described in detail below, the surface receiving and processing equipment 18 will have stored thereon a demodulation technique corresponding to the selected modulation technique used by the EM telemetry tool 32 and the unique phase or frequency value of each separate waveform of the carrier wave used by the downhole EM telemetry tool 32 to encode the separate waveforms, so that the carrier wave can be decoded to obtain the telemetry data.

The surface receiving and processing equipment 18 comprises a surface receiver 80 and a decoder 82. The surface receiver 80 comprises a preamplifier 84 electrically coupled to the communication cables 17 to receive and amplify the EM telemetry transmission comprising the carrier wave, a band pass filter 86 communicative with the preamplifier 84 configured to filter out unwanted noise in the transmission, and an analog to digital converter (ADC) 88 communicative with the band pass filter 86 to convert the analog carrier wave into a digital signal. Such preamplifiers, band pass filters, and A/D converters are well known in the art and thus are not described in detail here. For example, the preamplifier can be an INA118 model from Texas Instruments, the ADC can be an ADS1282 model from Texas Instruments, and the band pass filter can be an optical band pass filter or an RLC circuit configured to pass frequencies between 0.1 Hz to 20 Hz.

The decoder 82 in one embodiment is a general purpose computer comprising a central processing unit (CPU and herein referred to as "surface processor") and a memory having decoder program code executable by the surface processor to perform various decoding functions, including digital signal filtering and separation, digital signal processing, digital signal recombination, and digital signal-to-telemetry data decoding. Instead of using the surface processor to perform all of the decoding functions, separate hardware components can be used to perform one or more of the decoding functions; for example, an application-specific integrated circuit (ASIC) or field-programmable gate arrays (FPGA) can be used to perform the digital signal processing in a manner as is known in the art (FIG. 5 shows decoding steps performed by the surface processor as blocks within the decoder 82, although these blocks can alternatively represent separate hardware components that perform the same functions).

Figure 7:
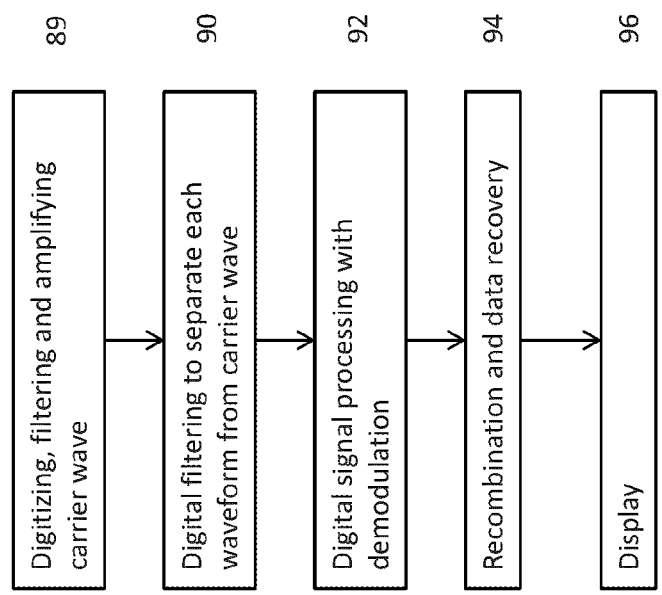
FIG. 7 is a flow chart of steps performed by the surface components of the multi-channel EM telemetry system to receive and decode the multi-channel EM telemetry signal transmitted by the downhole EM telemetry tool.

Referring to FIG. 7, the decoder 82 receives the carrier wave that has been digitized, filtered and amplified by the surface receiver 80 (step 89), and performs each of the following decoding functions in the following sequence (these decoding functions are stored as program code on the memory of the computer and are executable by the surface processor):

Digital Filtering (step 90): When each of the different waveforms is encoded by a modulation technique at a unique frequency, the program code comprises a series of band pass filters that are used to separate different bands (frequency signals) from the carrier wave. More particularly, each band pass filter is configured to pass one of the unique frequency bands corresponding to one of the separate waveforms and severely attenuate all other frequencies, such that the waveform corresponding to this unique frequency band can be separated from the carrier wave.

Figure 12:
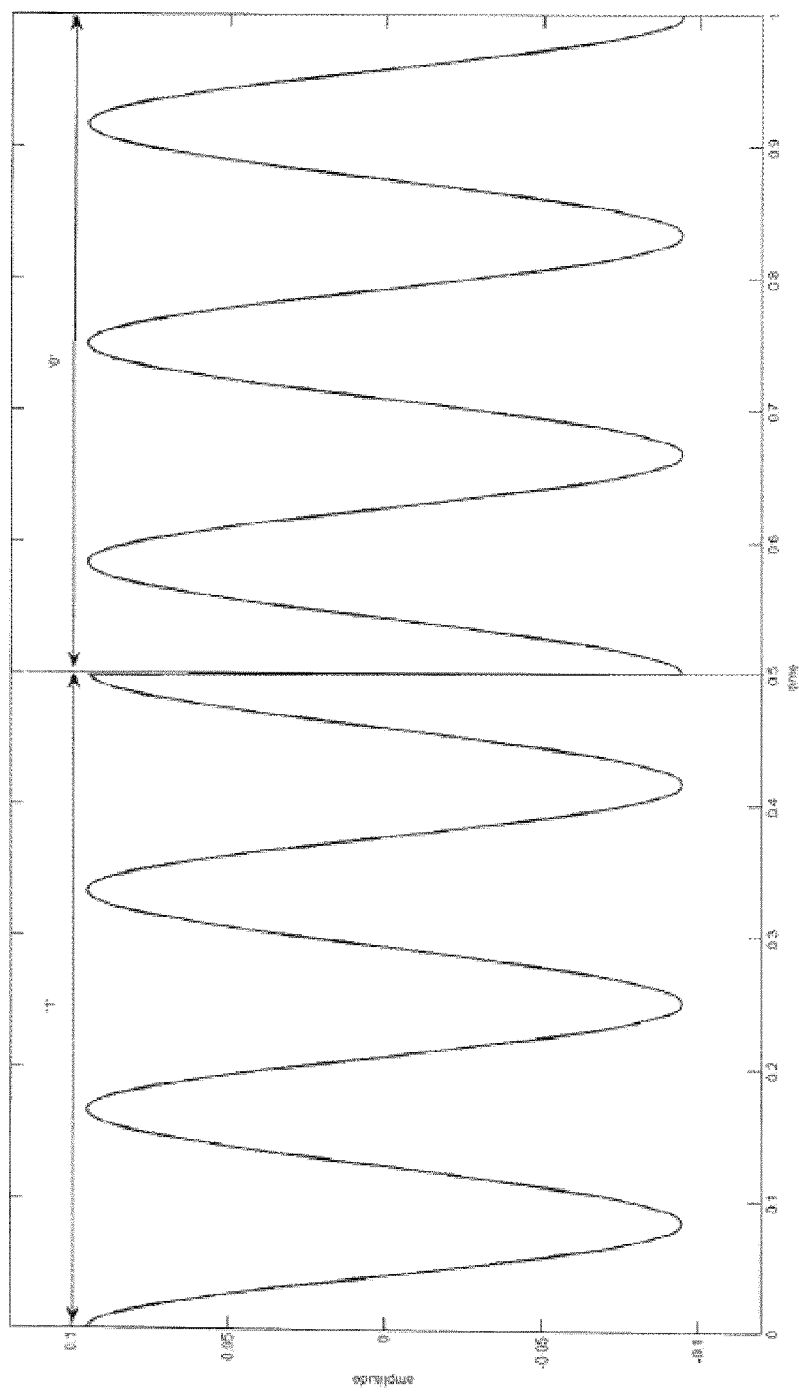
FIG. 12 is a graph of first telemetry signal separated from the EM telemetry signal by the surface components.
Figure 13:
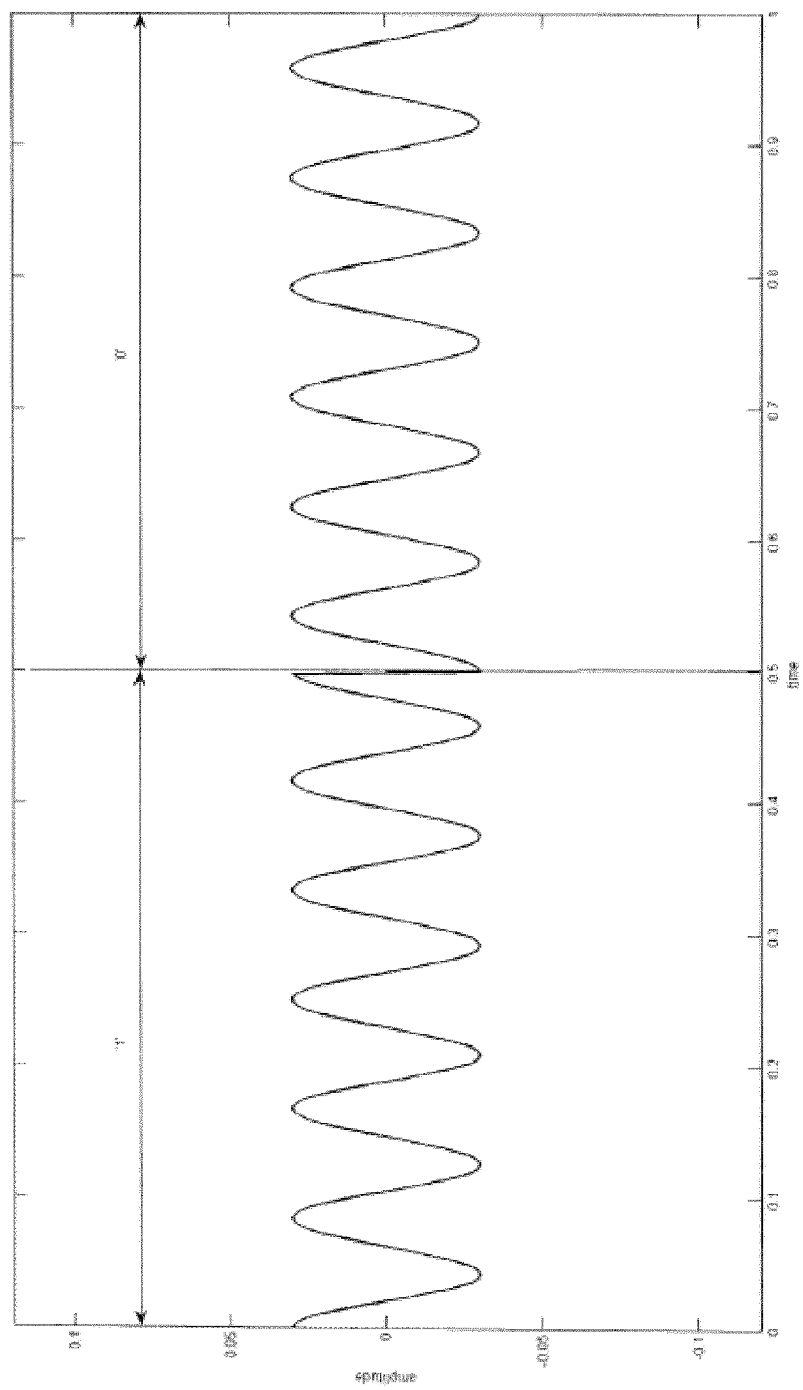
FIG. 13 is a graph of second telemetry signal separated from the EM telemetry signal by the surface components.

Digital Signal Processing (Step 92): Each separated waveform is in a bitstream form and is then subjected to a series of digital processing treatments known in the art, such as automatic gain control (AGC) to normalize the signal amplitude, synchronization to find the phase and timing differences between incoming signals and local oscillation signals, and demodulation and decoding to recover binary bits. Such digital processing treatments are known in the art of digital signal processing and thus are not described in detail here. Then, each separate waveform is demodulated back into the corresponding measurement data bitstream using a demodulation technique that is configured to correspond specifically to the modulation technique used to encode the separate measurement data bitstreams into the separate waveforms. Using the example shown in FIGS. 8 to 10 but now referring to FIGS. 12 to 13, the demodulation technique will determine the phase of each separate waveform, and map the waveform back to the symbol it represents, thus recovering the original data bitstream (FIG. 12 shows the first waveform and FIG. 13 shows the second waveform). Such demodulation techniques are well known in the art and thus are not described in detail here.

Digital Signal Recombination (Step 94): After demodulation, the separate raw measurement data streams are recombined back into the single raw measurement data stream that existed at step 89. Once the single raw measurement data bitstream has been recombined, the data can be decoded and viewed on the computer display 20 or manipulated by the operator into a useful form for display (step 96).

Instead of recombining all of the separate measurement data streams into the single measurement data stream, a subset of separate data stream can be combined for display to the operator, or each individual data stream can be processed and displayed for the operator.

Figure 6:
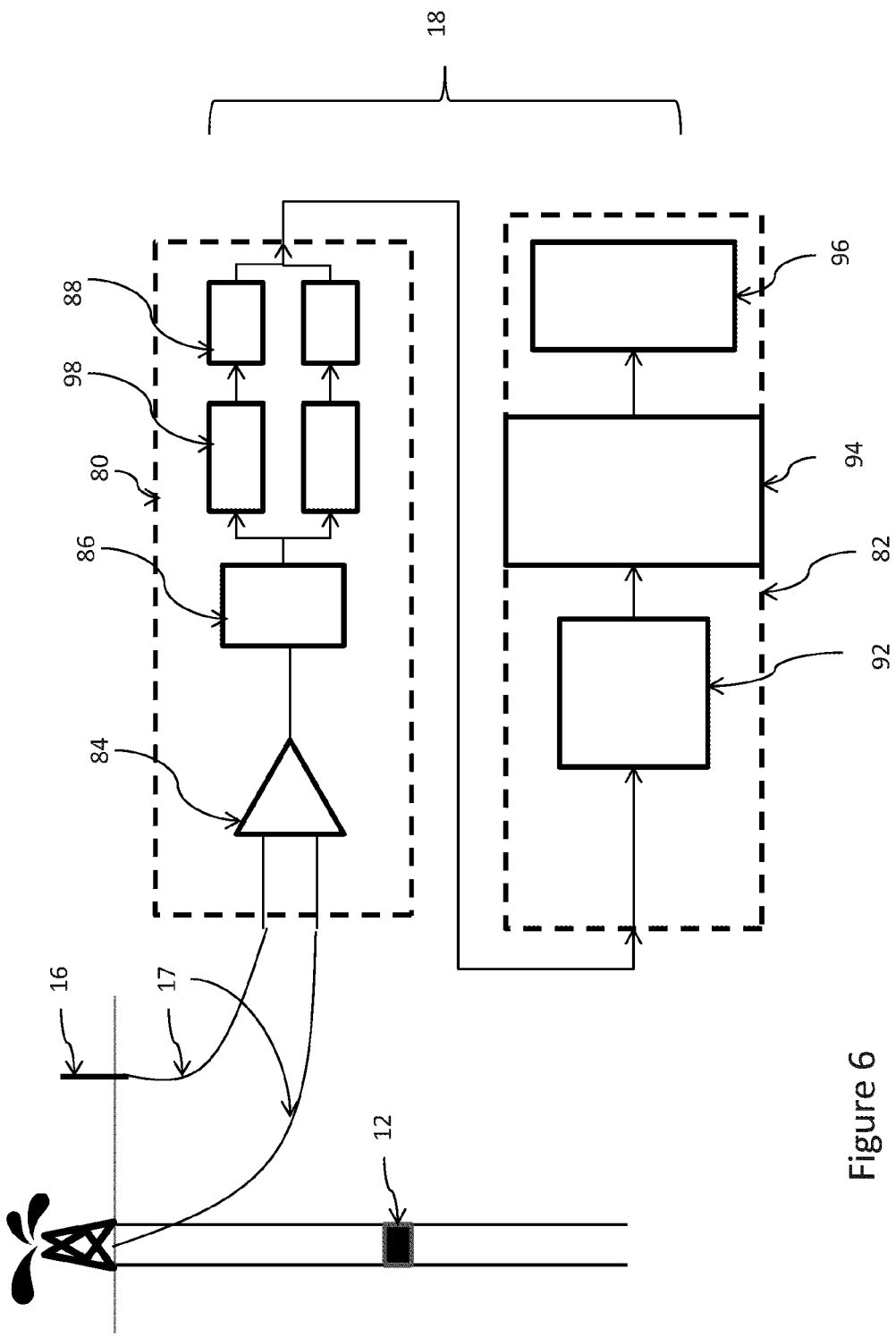
FIG. 6 is a schematic block diagram of surface components of the multi-channel EM telemetry system according to another embodiment.

According to an alternative embodiment and referring to FIG. 6, the surface receiver 80 and decoder 82 have been modified such that all signal filtering is performed by the surface receiver 80 on the analog waveforms, prior to digitization. More particularly, the surface receiver 80 employs narrow band hardware filters 98 of different frequency ranges to separate out each separate analog waveform from the analog carrier wave. Multiple ADCs are then used to convert the multiple analog waveforms into digital signals. In contrast, the surface receiver 80 and decoder 82 according to FIG. 5 perform analog signal filtering of the analog carrier wave, as well as digital signal filtering of the digitized carrier wave. Here, only one ADC is used to convert the carrier wave into digital form, and digital bandpass filtering is performed by software rather than by hardware.

Figure 14:
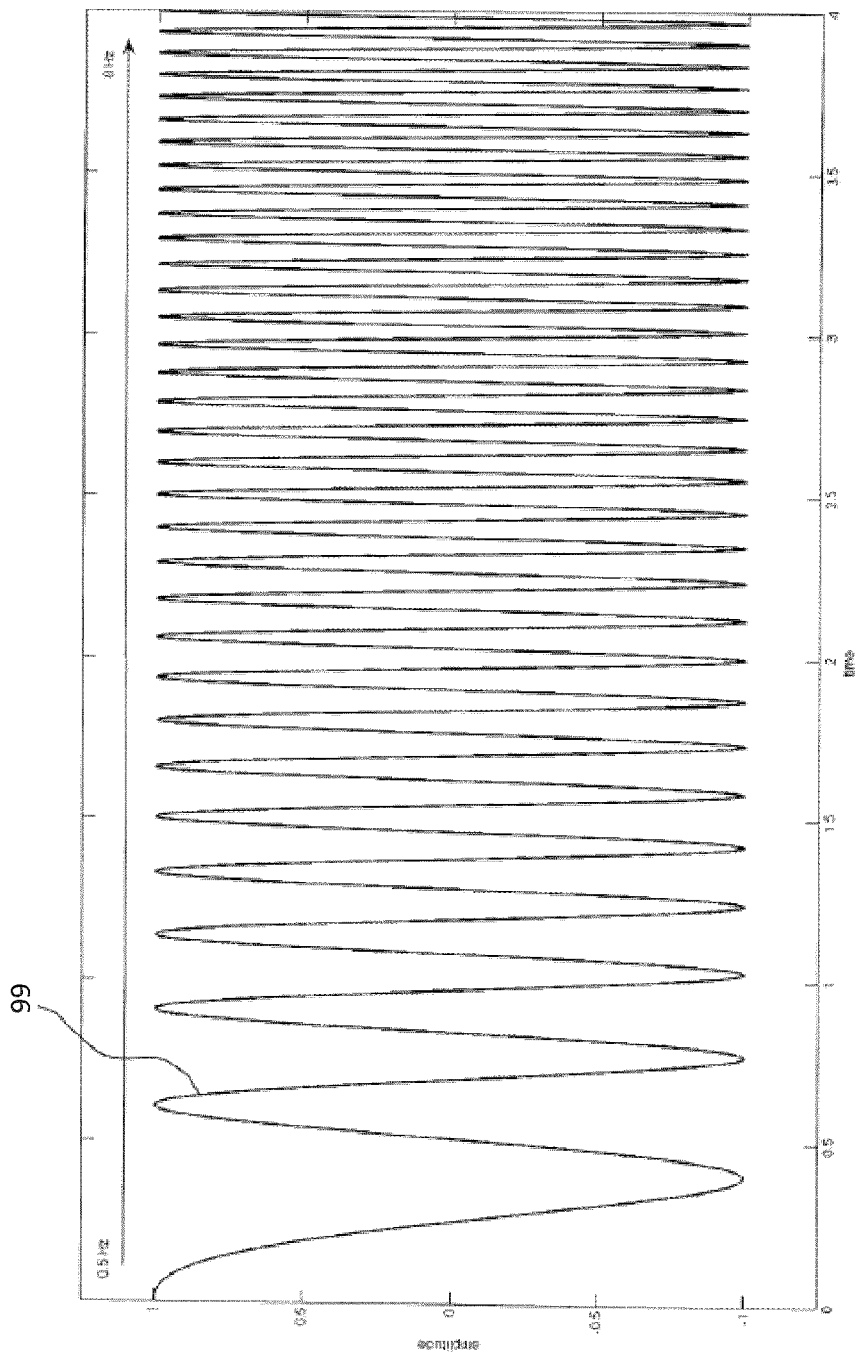
FIG. 14 is a graph of a downhole reference frequency sweep waveform having a continuously increasing frequency according to one embodiment.
Figure 15:
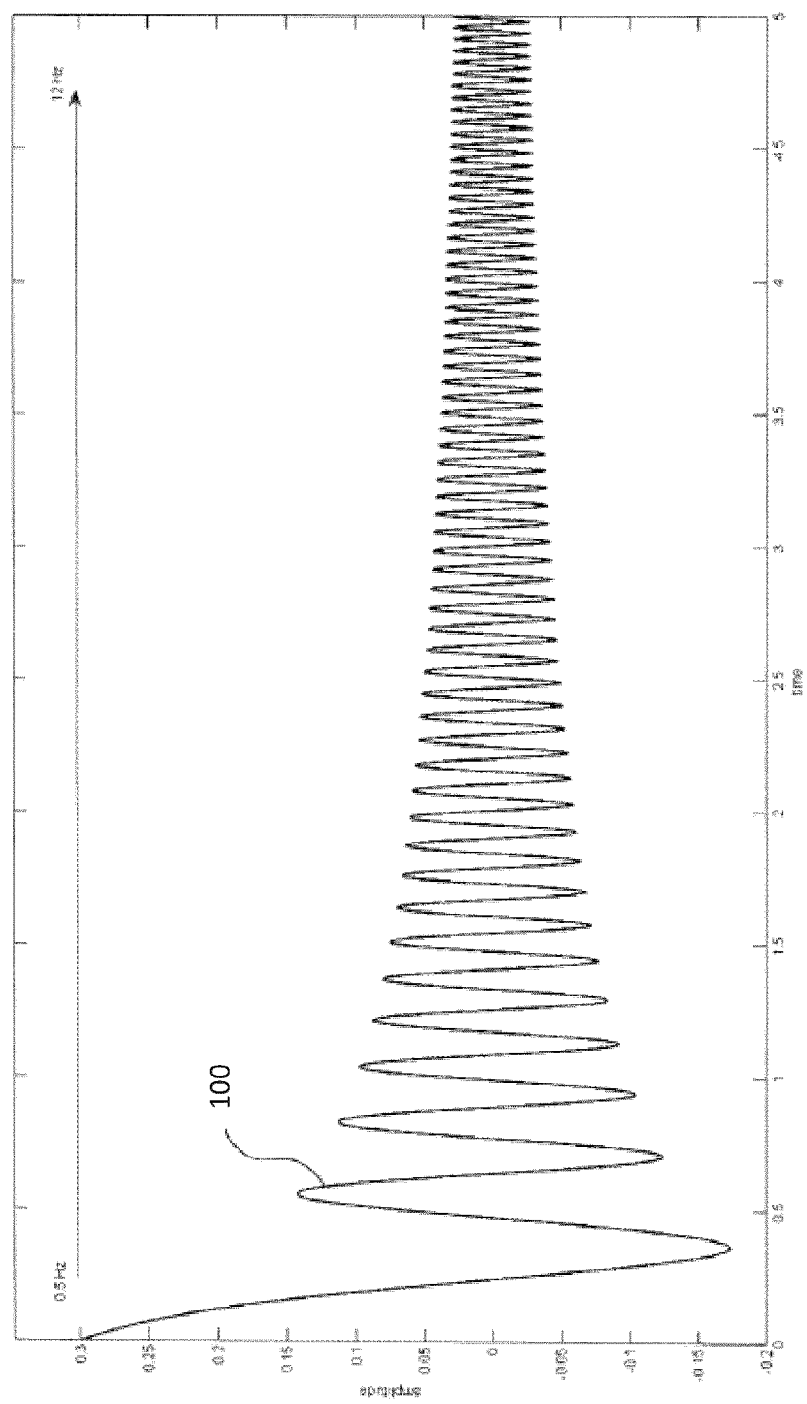
FIG. 15 is a graph of the downhole reference frequency sweep waveform of FIG. 14 as received by a surface receiver.
Figure 16:
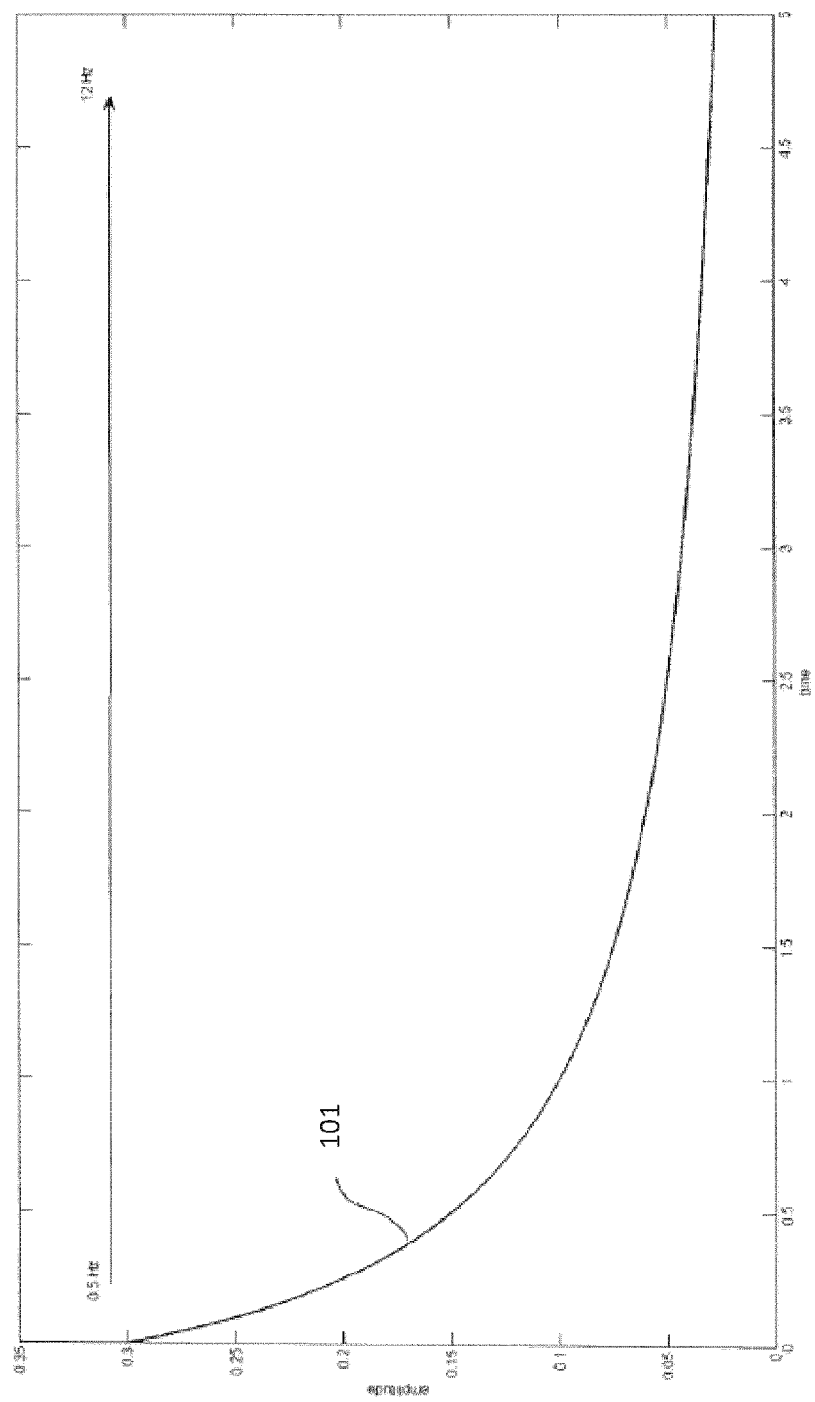
FIG. 16 is a graph plotting the amplitude against frequency range of the received downhole frequency sweep waveform of FIG. 15.

Optionally, the decoder 82 can also execute an algorithm which compensates for attenuation caused by the low pass filter characteristics of the Earth and other conditions of the drill site. This attenuation compensation algorithm can be constructed in accordance with one of the methods illustrated in FIGS. 14 to 19. In a first method shown in FIGS. 14 to 16, a frequency sweep waveform 99 having a consistent reference amplitude and a continuously increasing frequency over a determined time period can be transmitted by the EM telemetry tool 32 during an idle time in the drilling so that the drilling process is not interrupted. As can be seen in FIG. 14, the reference amplitude is set to match the amplitude of each separate waveform used by the EM telemetry tool 32 to produce the combined waveform, and the frequency can be set to increase at a selected rate. As can be seen in FIG. 15, the frequency sweep waveform 100 received at surface will attenuate after having travelled through the Earth to the surface receiver 80. The attenuation rate will tend to increase with increasing frequency, wherein the value of the attenuation rate will vary with the physical properties and operating conditions of the drill site. As can be seen in FIG. 16, the amplitude of the received frequency sweep waveform can be plotted over the frequency range to produce an attenuation curve 101. This attenuation curve 101 is stored on the DSP 92 and is applied to the received waveforms to compensate for the attenuation caused by the Earth.

Figure 17:
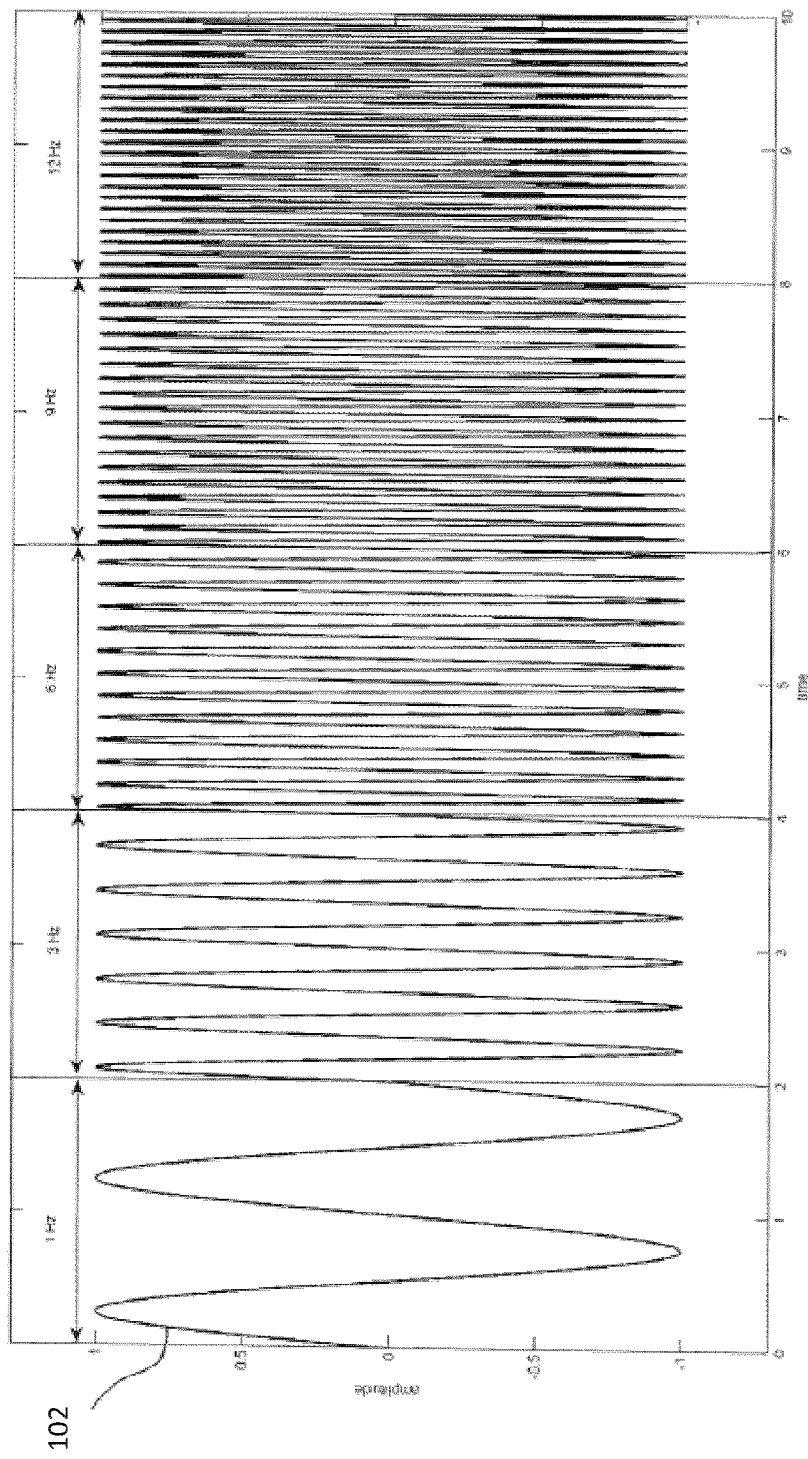
FIG. 17 is a graph of a downhole reference frequency sweep waveform having discrete frequency steps according to another embodiment.
Figure 18:
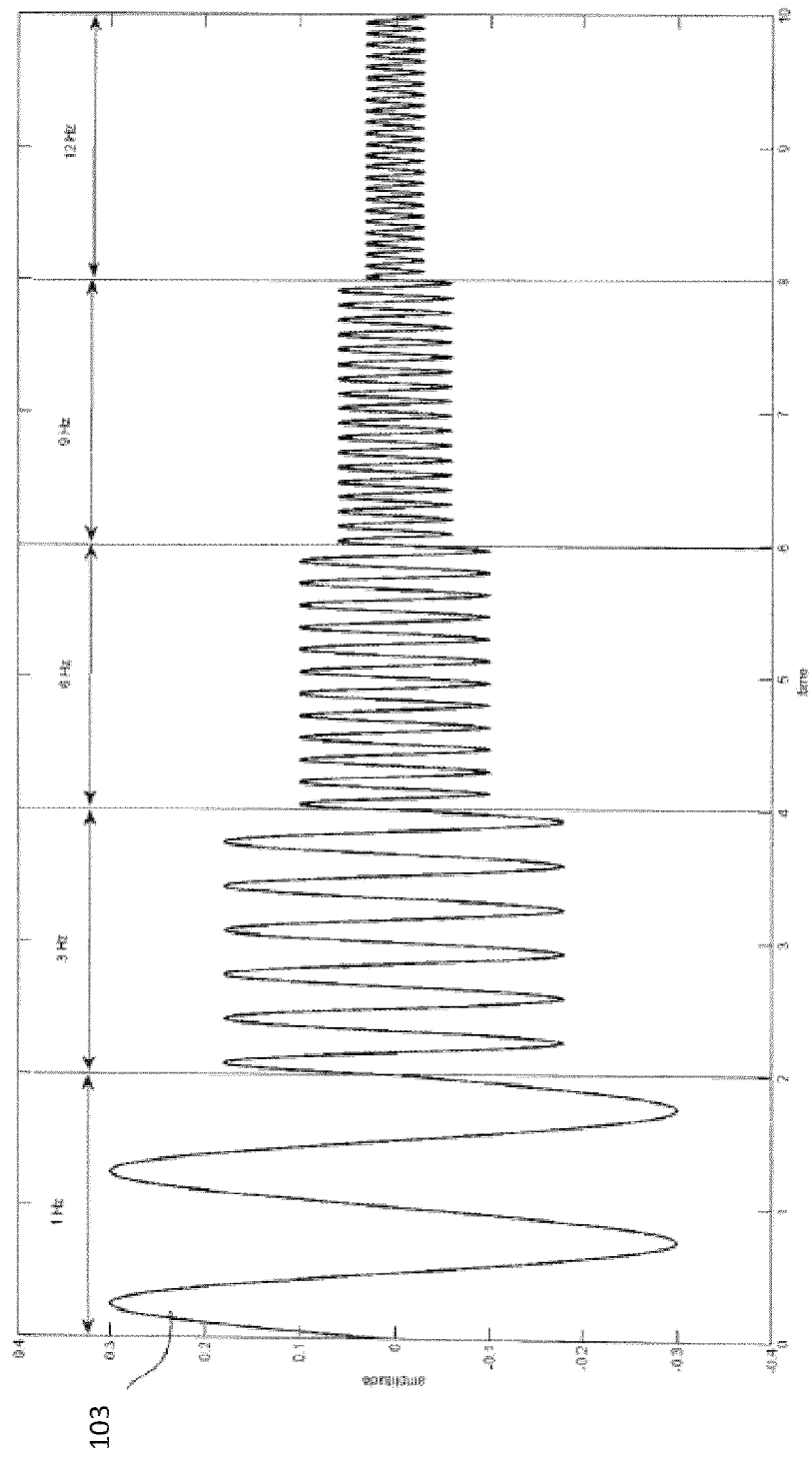
FIG. 18 is a graph of the downhole reference frequency sweep waveform of FIG. 17 as received by a surface receiver.
Figure 19:
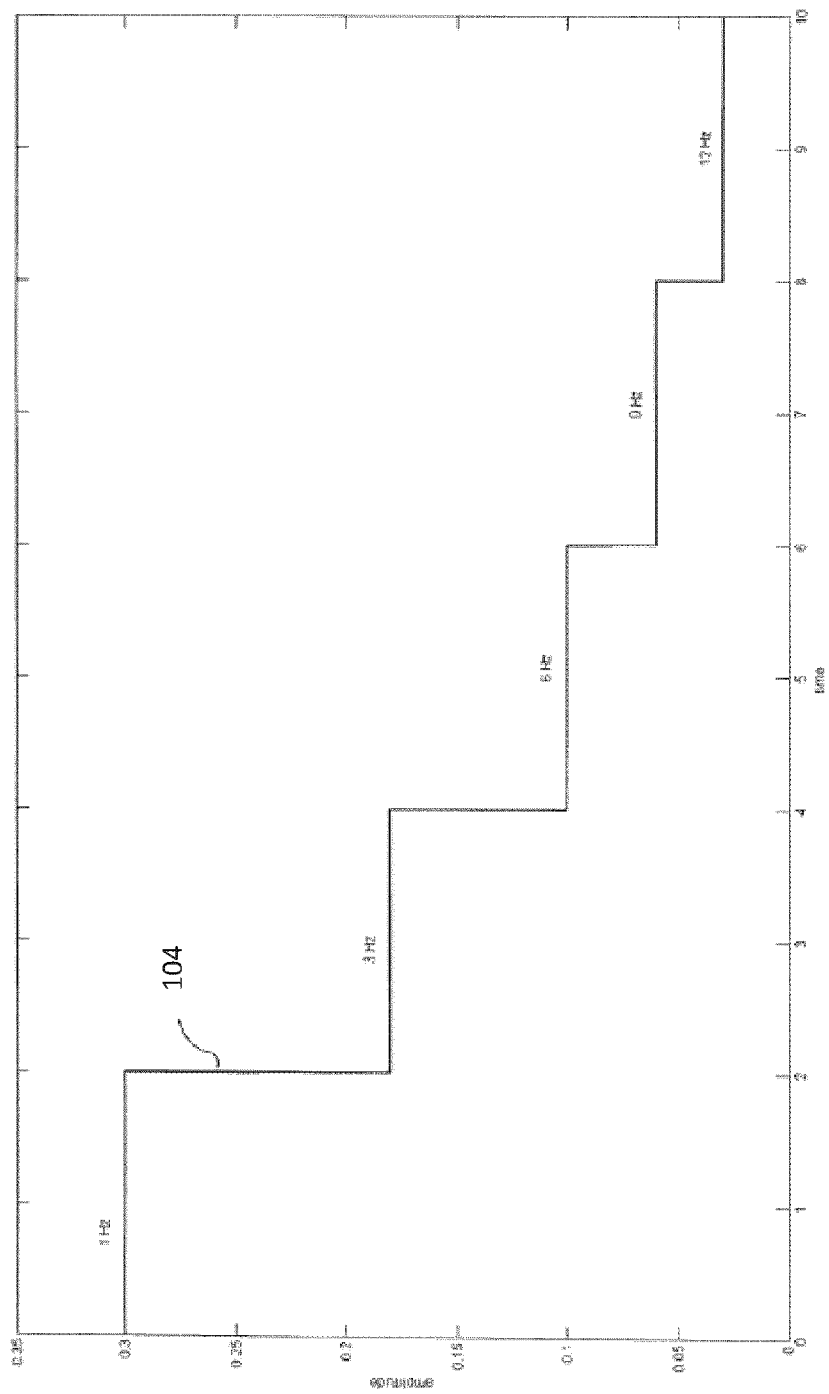
FIG. 19 is a graph plotting the amplitude against frequency range of the received downhole frequency sweep waveform of FIG. 18.

According to another embodiment, other frequency sweep waveforms 102 and 103 and an attenuation curve 104 produced from this frequency sweep waveform are shown in FIGS. 17 to 19, respectively. In this frequency sweep waveform 102, the frequency is held constant for a short period of time, then changed in discrete steps. FIG. 17 shows this frequency sweep waveform as transmitted by the EM telemetry tool 32, and FIG. 18 shows an attenuated frequency sweep waveform 103 as received by the surface receiver which has been attenuated travelling through the Earth. FIG. 19 shows a stepped attenuation curve over frequency. For the frequencies of the first and second downhole waveforms shown in FIGS. 8, 9 (6 and 12 Hz), the expected surface amplitude levels would approximately be 0.1 and 0.03 based on downhole amplitudes of 1.0.

Reducing Header Delays

Measurement data bitstreams are typically encoded into frames ("data frames") for transmission. Periodically transmitted with the data frames in the bitstreams are header portions, comprising one or both of long headers and identifiers (IDs). The long headers are fixed and accordingly are independent of the content of the data frames; they are used to synchronize communications between the EM signal transmitter 13 and receiver 80. The IDs indicate the type of data comprising the data frame, and accordingly vary with the type of data frame sent. For example, the data frame may comprise data that (a) is obtained during a survey (this type of data frame is a "survey frame"); 11

(b) is obtained during sliding drilling, which is powered using a mud motor and without rotating the drill string at surface (this type of data frame is a "sliding frame");

(c) is obtained during drilling powered using a rotary table or top drive (this type of data frame is a "rotating frame"); or (d) indicates a change in telemetry type, speed, amplitude, configuration, or of some other characteristic potentially useful to the receiver 80 (this type of data frame is a "status frame"). Unlike the survey, sliding, and rotating frames, the status frame is triggered by particular events that occur during drilling rather than by the type of drilling being performed or the purpose of the measurements being made.

The data in the data frame comprises a series of data packets. The data frame also includes error detection and correction bits, such as CRC bits.

In an embodiment in which the transmitter 13 is able to send survey, sliding, rotating, and status frames, the ID may, for example, be three bits long, and be "000" when a survey frame is sent, "010" when a sliding frame is sent, "100" when a rotating frame is sent, and "101" when a status frame is sent. Other possible values for the ID can be reserved for other types of frames.

Figure 21A:
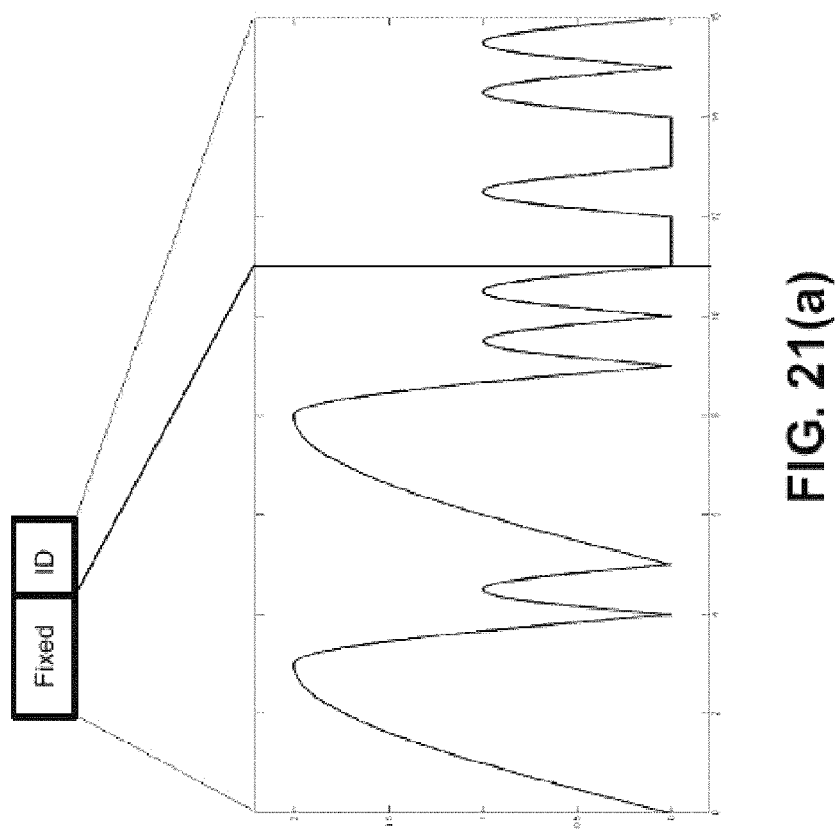
FIG. 21(a) depicts an exemplary waveform of a header portion of a frame.

As mentioned above, the long headers are fixed and are used to synchronize communications between the EM signal transmitter 13 and receiver 80. Synchronization is useful, for example, when determining the phase of a carrier wave or pulse timing during demodulation. The long header is transmitted once every several frames to permit periodic synchronization. Conventional long headers are relatively large at approximately 15 to 20 bits so that the receiver 80 is able to distinguish them from the data frames and to reduce the likelihood that one of the data frames and one of the long headers are inadvertently identical. FIG. 21(a) depicts an exemplary one of the long headers and IDs. The EM signal transmitter 13 and the surface receiver 80 both have access to a configuration file, which details the different types of data frames that can be sent and the different long headers and IDs that may be used; for example, the configuration file may contain information describing the timing, frequency, signal processing method, and data structure of the different possible data frames.

Figure 21B:
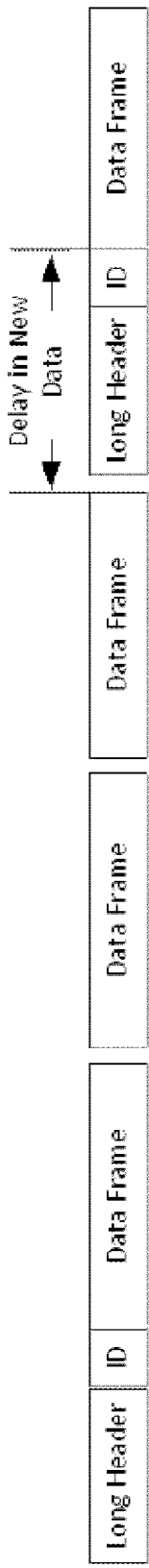
FIGS. 21(b) and (c) depict exemplary bitstreams transmitted serially along a single channel.

FIG. 21(b) depicts an exemplary measurement data bitstream comprising a plurality of data frames transmitted serially in one channel along a single carrier wave. Periodically, the header portion comprising the long header and ID is re-transmitted; when sent, it is transmitted between the end of one data frame and the beginning of another. In FIG. 21(b), the period during which the long header and ID are transmitted is a period of delay during which no measurement data can be transmitted ("header delay"). The header delay reduces the effective data transfer rate between the transmitter 13 and receiver 80. In the bitstream of FIG. 21(b), the long header is transmitted after transmission of an entire one of the data frames.

Figure 21C:
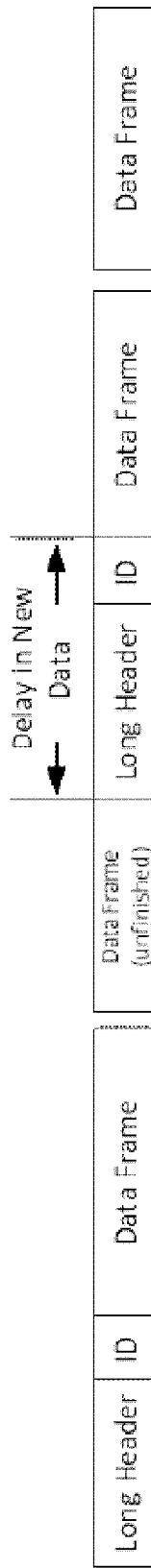

FIG. 21(c) shows another exemplary measurement data bitstream in which less than all of a data frame is transmitted before the long header is transmitted; that is, transmitting the long header interrupts transmitting a data frame. Notwithstanding this difference with the bitstream of FIG. 21(b), the period during which the long header and ID are transmitted in the bitstream of FIG. 21(c) also reduces the effective data transfer rate between the transmitter 13 and the receiver 80.

To increase the effective data transfer rate between the transmitter 13 and the receiver 80 relative to the bitstreams of FIGS. 21(b) and (c), the EM telemetry system 30 can be used to transmit the long header and data frame using at least two different channels at two different frequencies. On at least one of the channels the transmitter 13 transmits the data frame, while on at least another of the channels the transmitter 13 transmits at least part of the long header. The embodiments depicted in FIGS. 22 through 26 transmit all of the data frame on one channel, which is hereinafter referred to as the "data channel"; they transmit all of the long header on another channel, which is hereinafter referred to as the "header channel". The ID is transmitted on either of the channels. Transmitting the long header and the data frame on separate channels allows the length of the long header to be decreased compared to when the long header and data frame are transmitted on the same channel, since the receiver 80 is able to assume that any transmission received on the header channel is the long header instead of having to determine from the content of a bitstream whether that bitstream represents the data frame or long header. For example, in the depicted embodiments the length of the long header can be reduced from approximately 15 to 20 bits to approximately 7 bits. Additionally, in embodiments in which the data channel and the header channel are used to simultaneously transmit a data frame and a long header, respectively, the effective data transfer rate is increased relative to when only a single channel is used to transmit both the data frame and long header.

While the EM signal transmitter 13 used in the examples discussed below is downhole while the receiver 80 is at surface, in alternative embodiments the transmitter 13 and receiver may be downhole, or the transmitter 13 may be at surface and the receiver may be downhole.

Figure 24A:
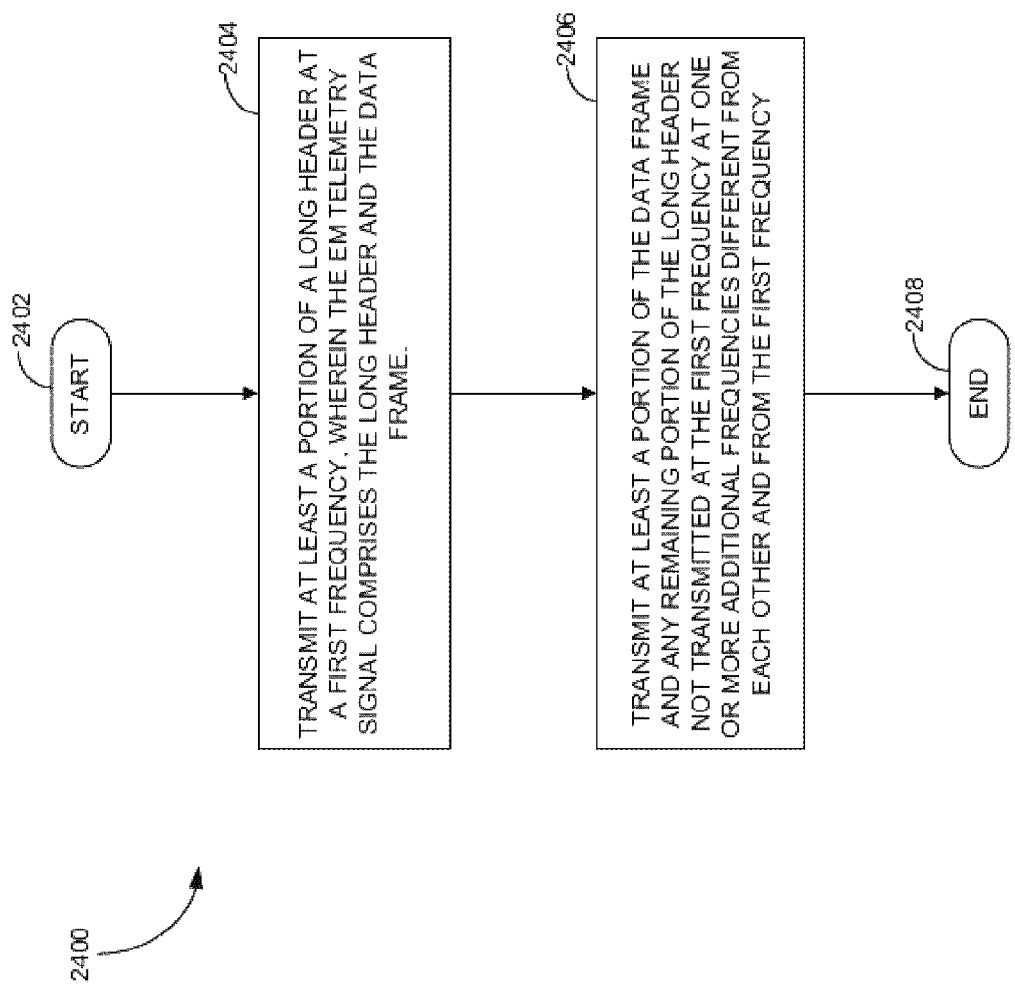
FIGS. 24(a) and (b) and FIGS. 25(a)-(c) depict various methods for transmitting a frame to or from a downhole location, according to additional exemplary embodiments.

Referring now to FIG. 24(a), there is shown a method 2400 for transmitting the data frame of the EM telemetry signal according to one embodiment. The downhole processor 56 begins performing the method 2400 at step 2402 and then proceeds to step 2404 where it transmits at least part of the long header, at a first frequency, which is the frequency of the carrier wave used for the header channel. The downhole processor 56 then proceeds to step 2406 where it transmits at least a portion of the data frame and any remaining portion of the long header not transmitted at the first frequency at one or more additional frequencies different from each other and from the first frequency. The first frequency and these one or more additional frequencies are sufficiently separated to permit demodulation of the portion of the long header transmitted at the first frequency and the portion of the data frame and any remaining portion of the long header transmitted at the one or more additional frequencies. In the embodiments discussed below, the remaining portion of the EM telemetry signal comprises all of the data frame and is transmitted at a second frequency that is the frequency of the carrier wave used for the data channel. Following transmission at step 2406, the processor 56 proceeds to step 2408 and the method 2400 ends.

In one embodiment, the frequencies of the carrier waves used to transmit the measurement data bitstreams on the data and header channels are separated by a minimum number of Hz to facilitate relatively error free demodulation of the bitstreams. The following analysis aids in determining proper levels of frequency separation between the data and header channels. This analysis also applies generally to any two-channel transmission performed by the system 30.

Suppose that f is the carrier frequency of the data channel, f' is the carrier frequency of the header channel, c is the chosen cycles per bit for the data channel, and c' is the chosen cycles per bit for the header channel; without loss of generality, f>f'. Additionally, c and c'>1.

The bandwidth occupied by the data channel is given by $$B_1 \in \left(f\left(1-\frac{1}{c}\right), f\left(1+\frac{1}{c}\right)\right). \quad (1)$$

The bandwidth for the header channel is $$B' \in \left(f'\left(1-\frac{1}{c'}\right), f'\left(1+\frac{1}{c'}\right)\right). \quad (2)$$

Therefore, in order not to incur bandwidth conflict between the two channels:

$$f'\left(1+\frac{1}{c'}\right) \leq f\left(1-\frac{1}{c}\right). \quad (3)$$

From Equation (3), it can be seen that $c \neq 1$.

If the cycles per bit chosen for the two channels are identical, which is typical in EM telemetry, Equation (3) can be simplified as $$f' \leq f\left(\frac{c-1}{c+1}\right). \quad (4)$$

In one embodiment, if cycles per bit for both channels c is three, then $f' \leq f/2$. Consequently, in this embodiment the maximum frequency for the header channel is f/2.

In another embodiment, if cycles per bit for both channels c is two, then $f' \leq f/3$. Consequently, in this embodiment the maximum frequency for the header channel is f/3.

While the frequency used for the header channel is less than that used for the data channel in the examples above, in alternative embodiments the frequency used for the header channel may be higher than that used for the data channel.

Figure 22C:
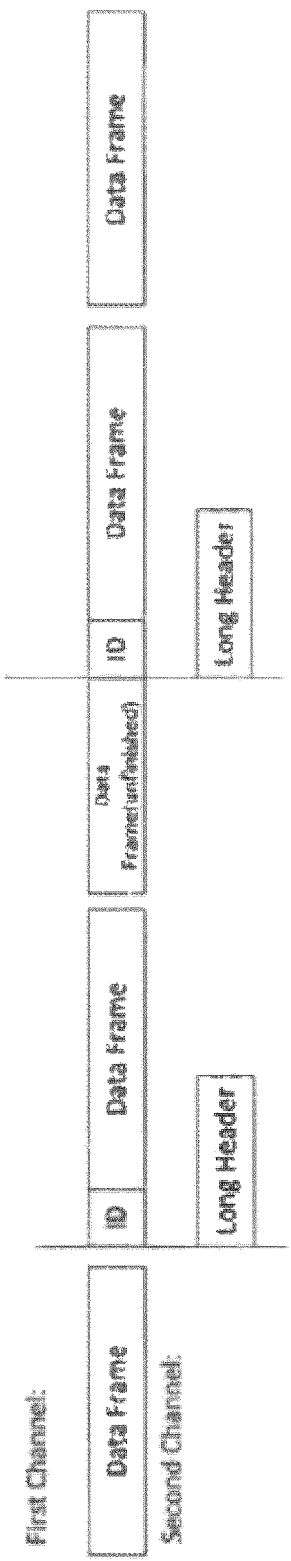
Figure 22D:
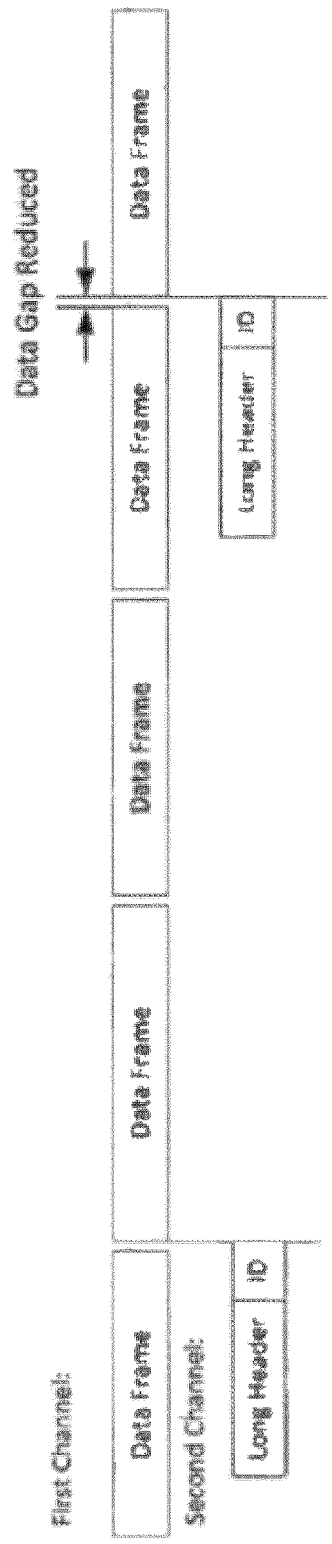
Figure 25A:
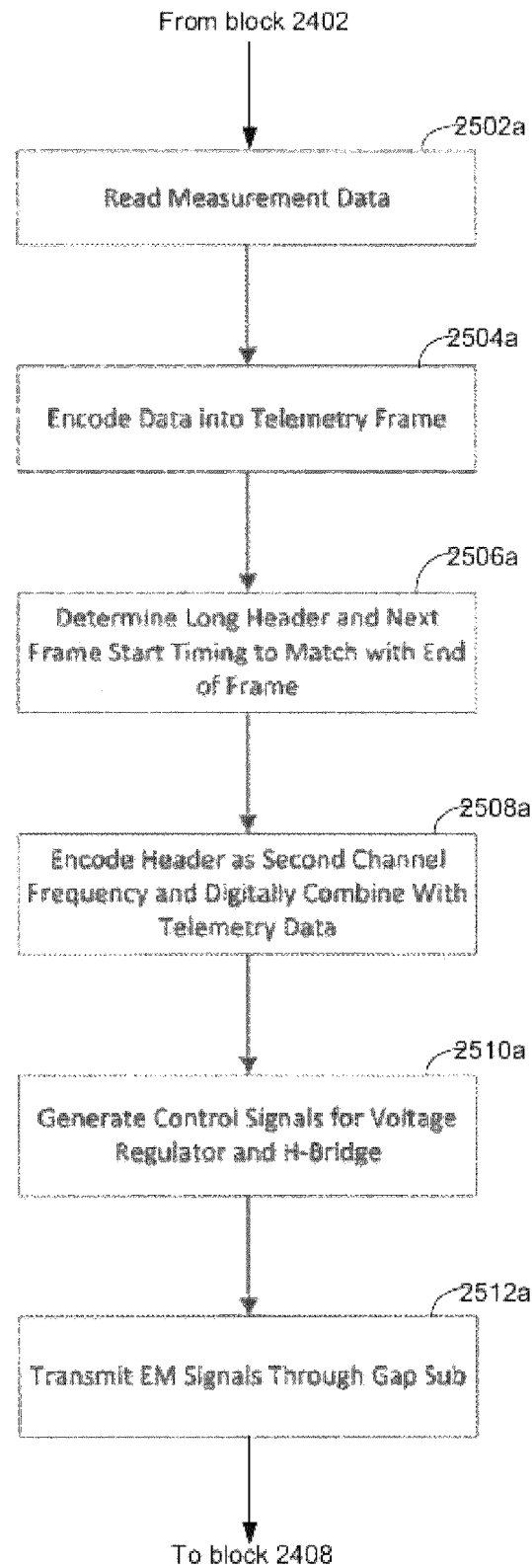
Figure 25B:
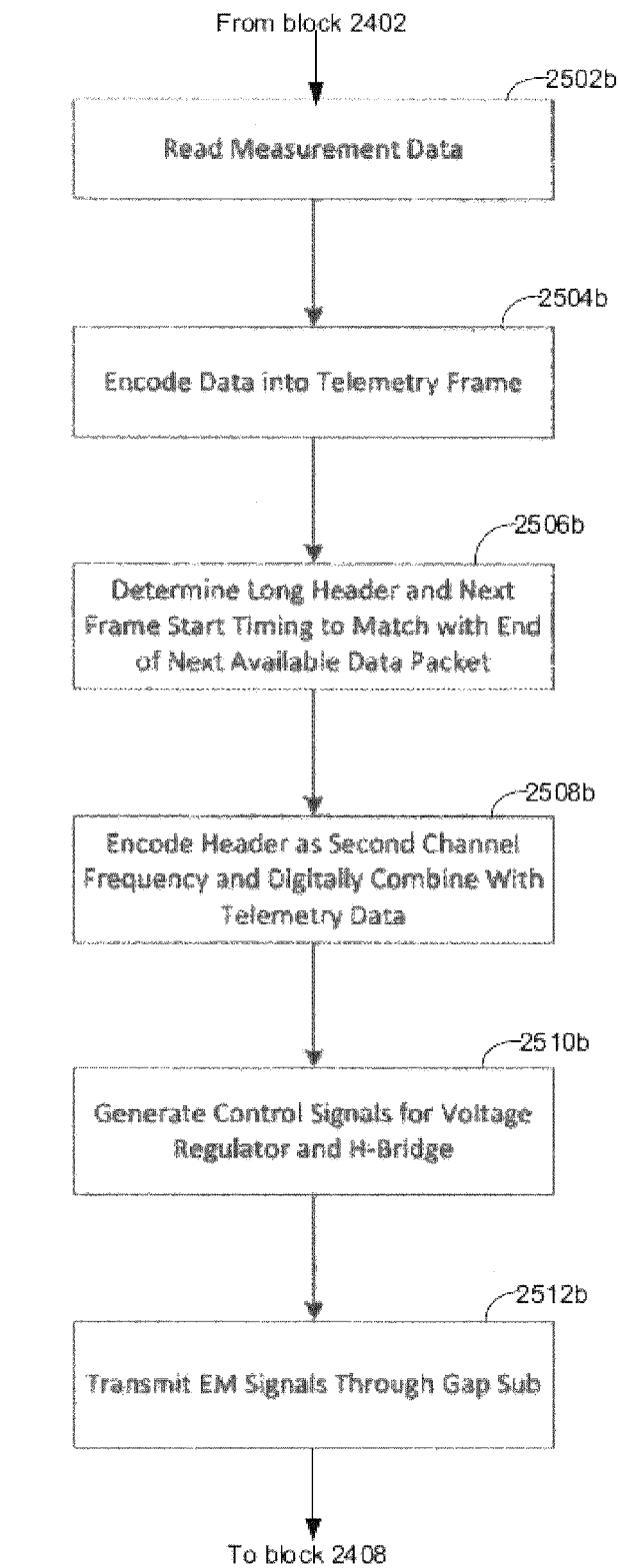
Figure 25C:
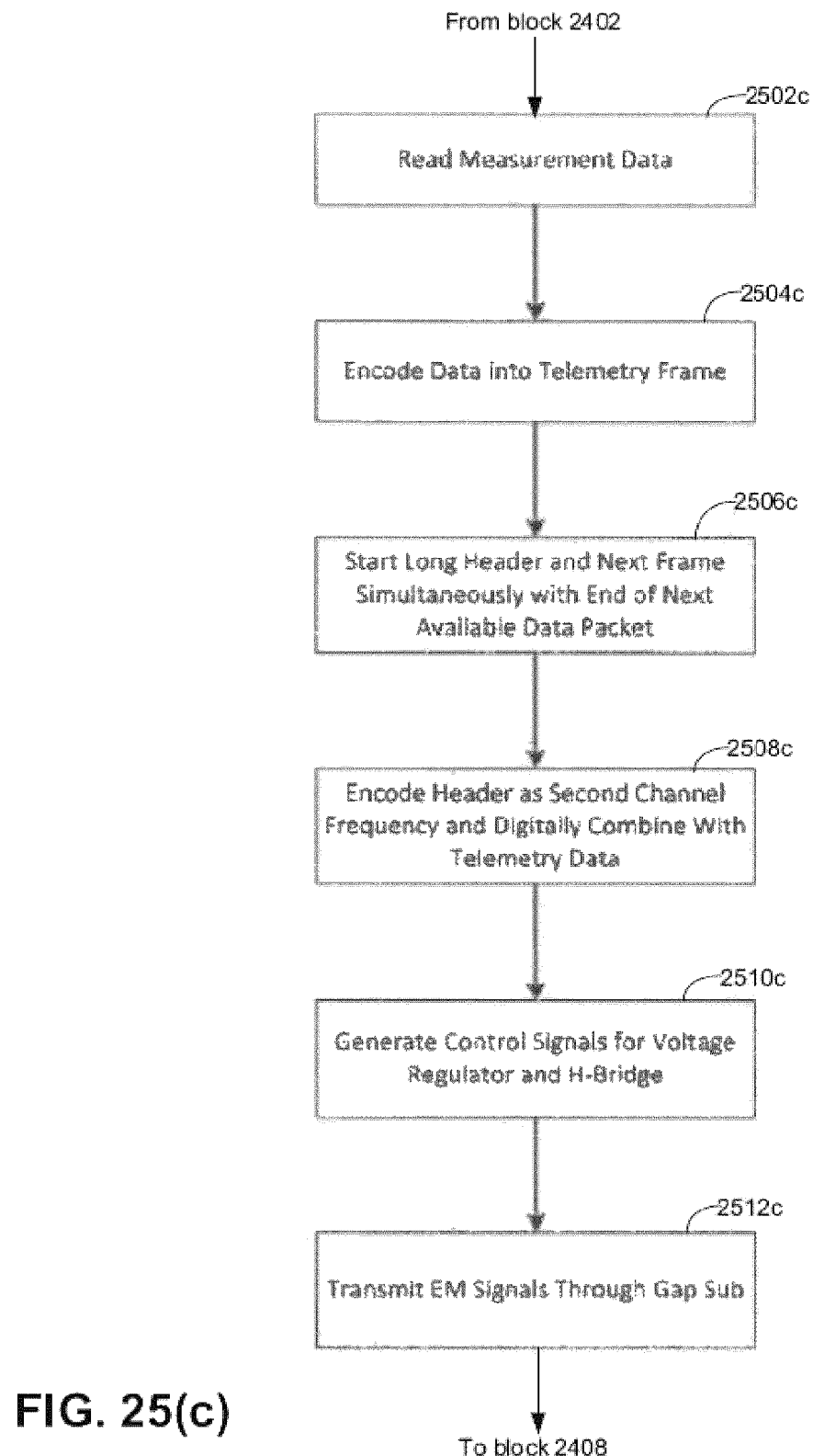
Figure 26A:
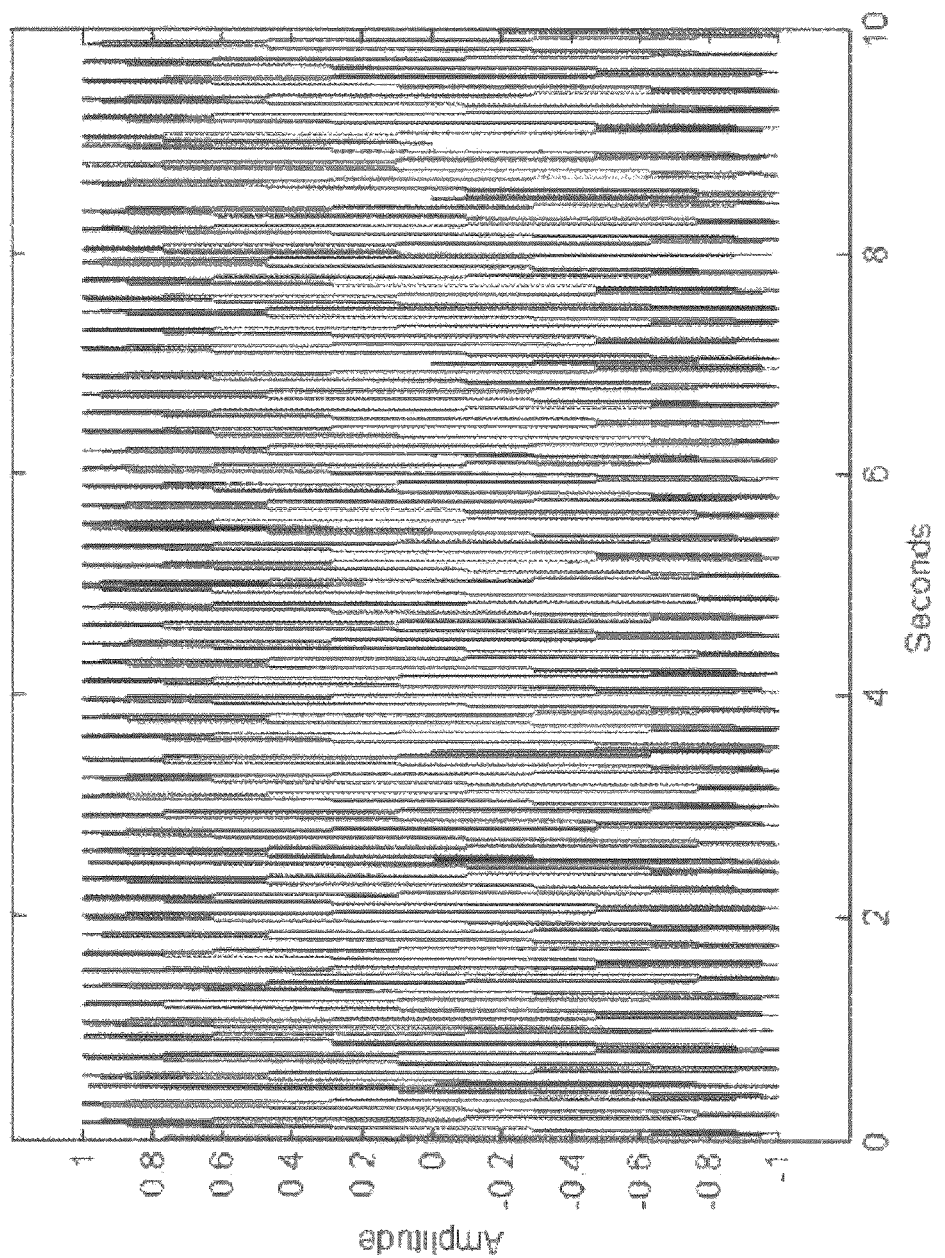
FIGS. 26(a)-(f) depict exemplary waveforms generated in accordance with the embodiment of FIG. 25(a).
Figure 26B:
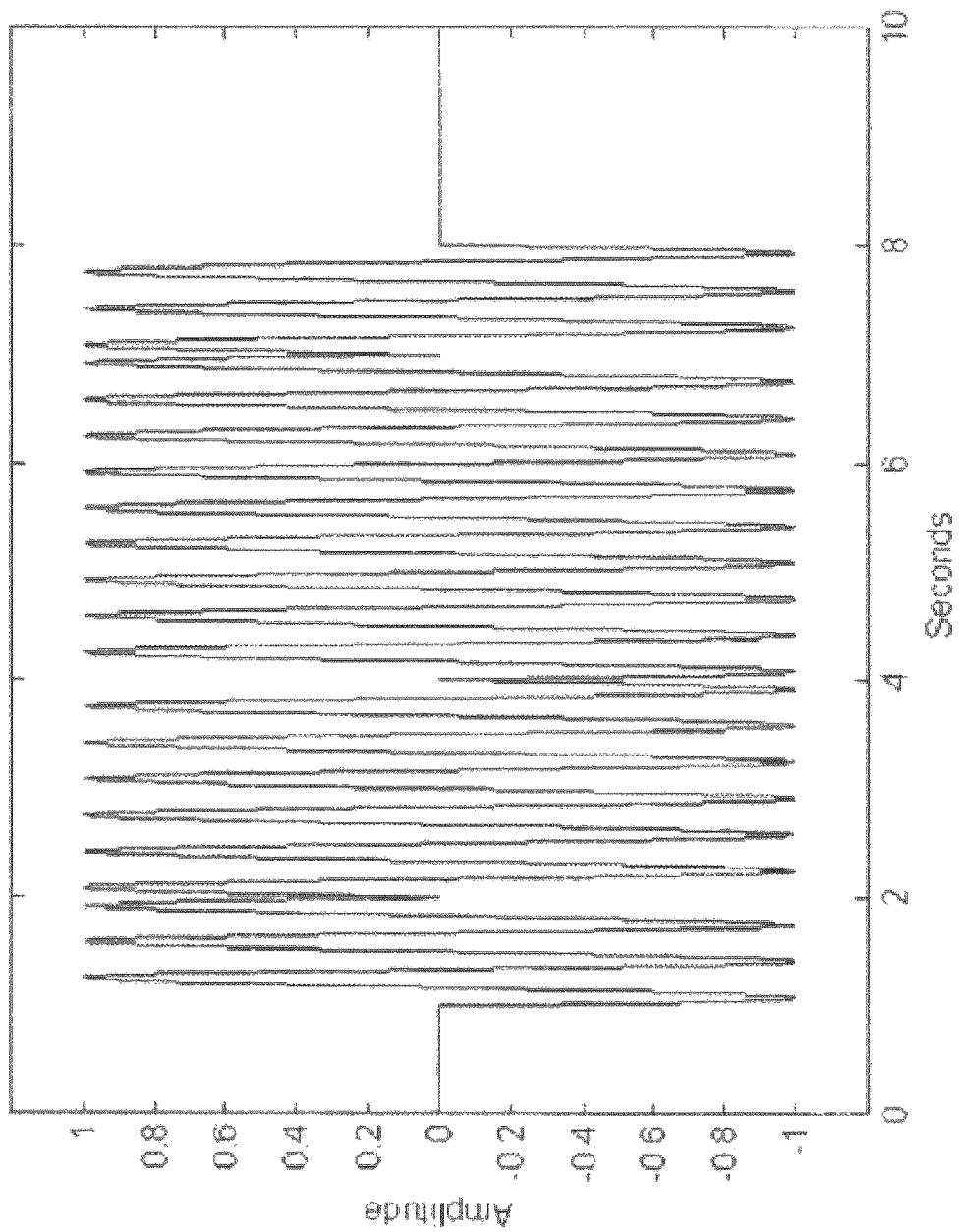
Figure 26C:
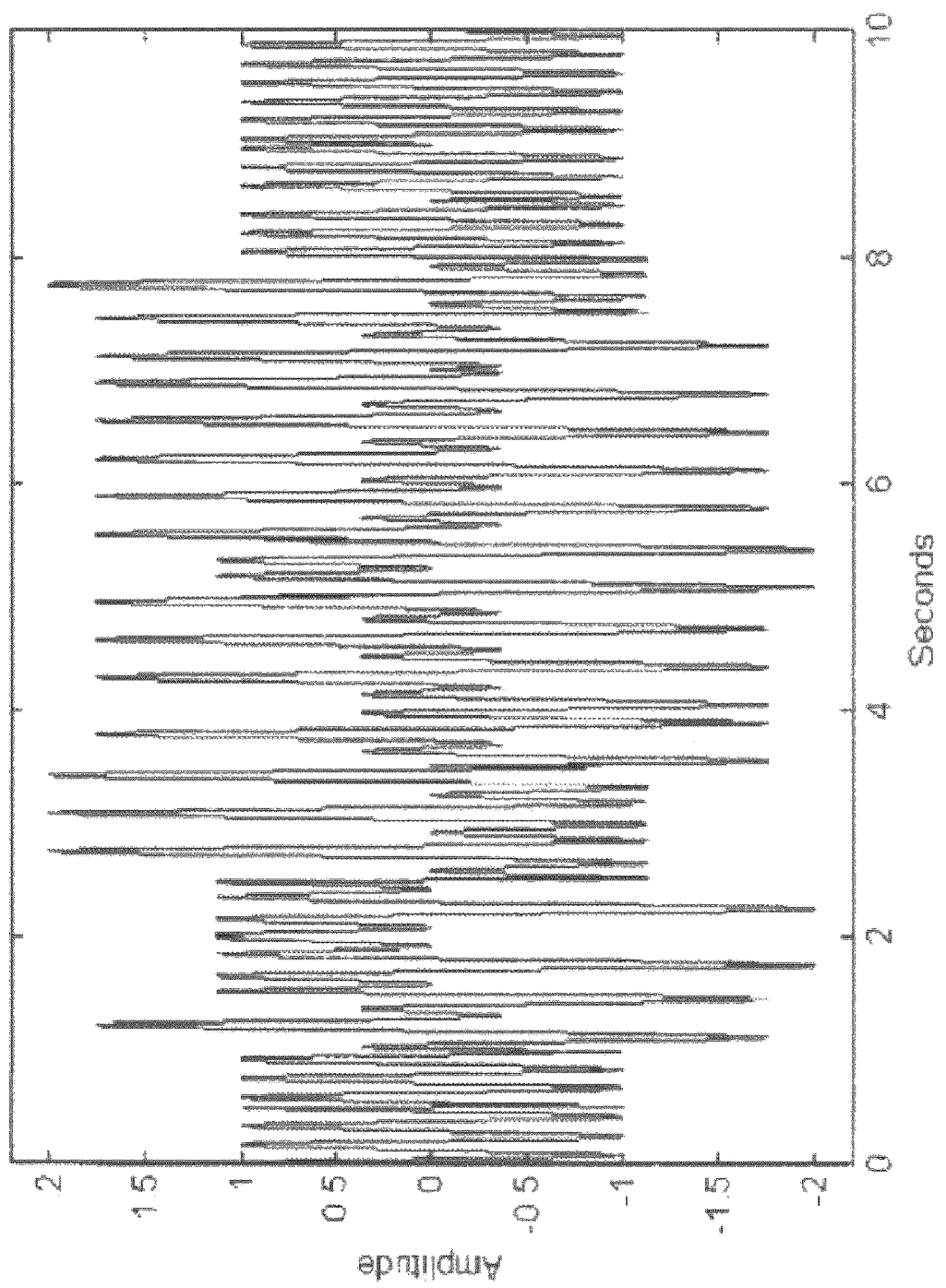
Figure 26D:
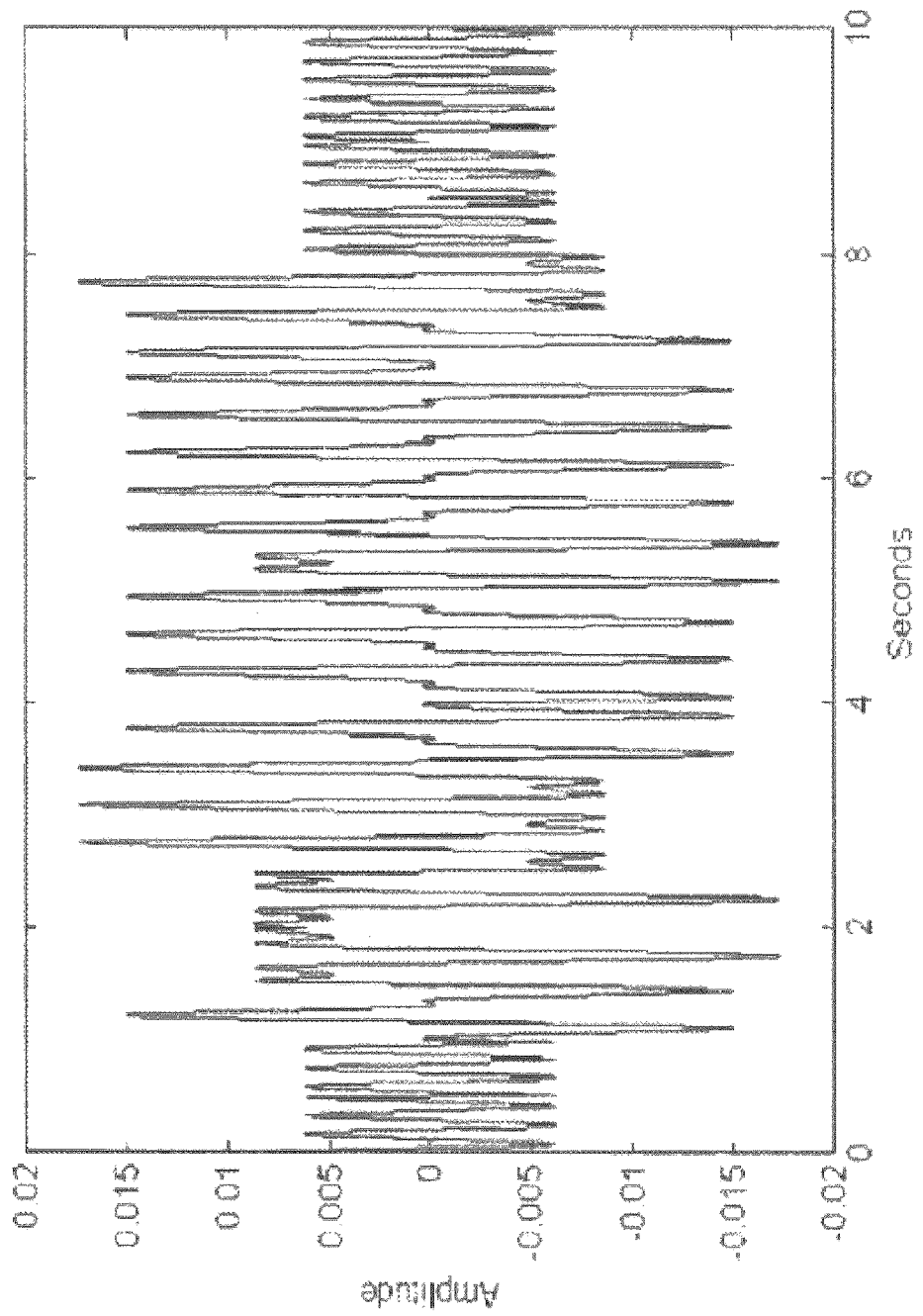
Figure 26E:
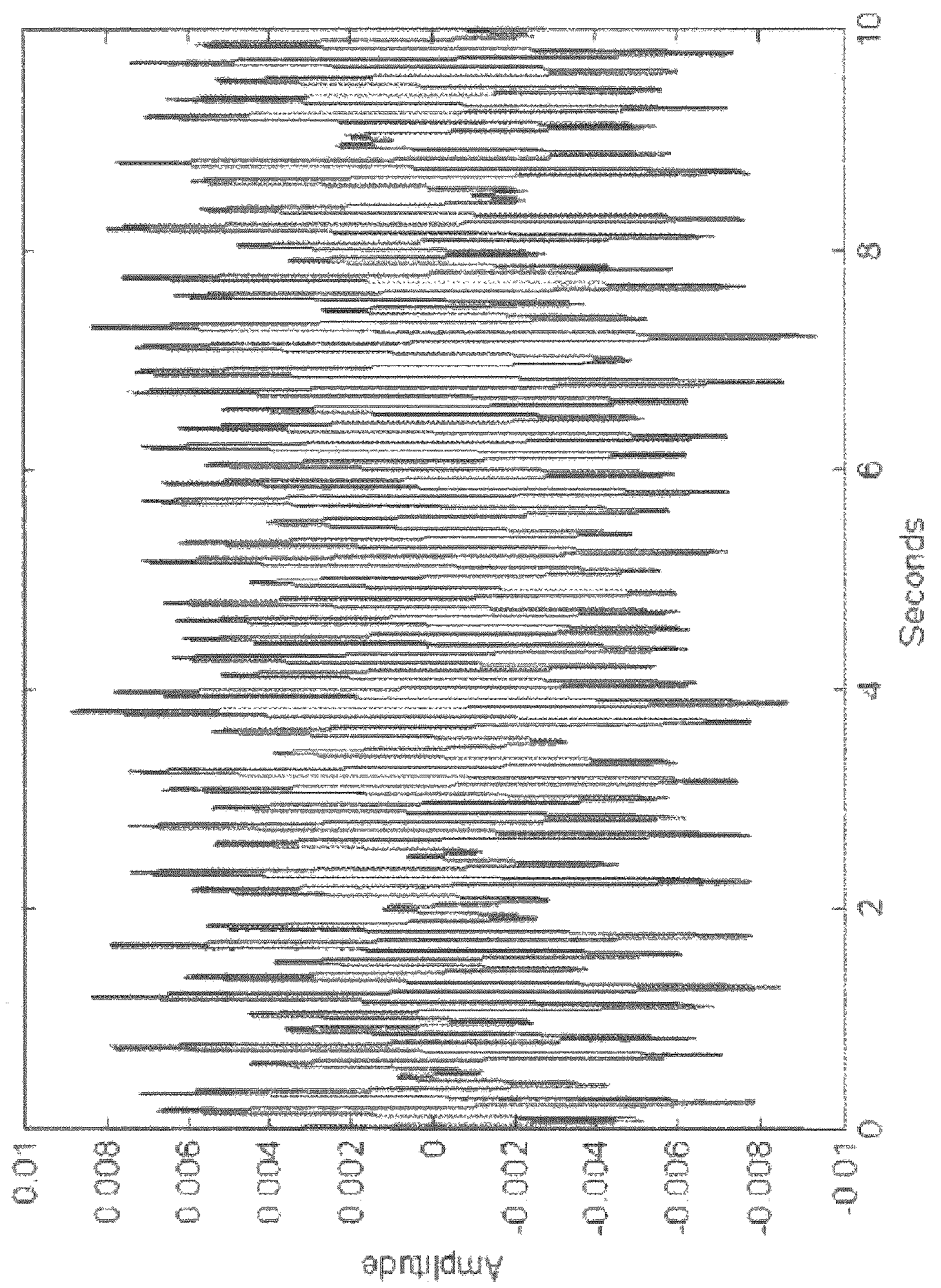
Figure 26F:
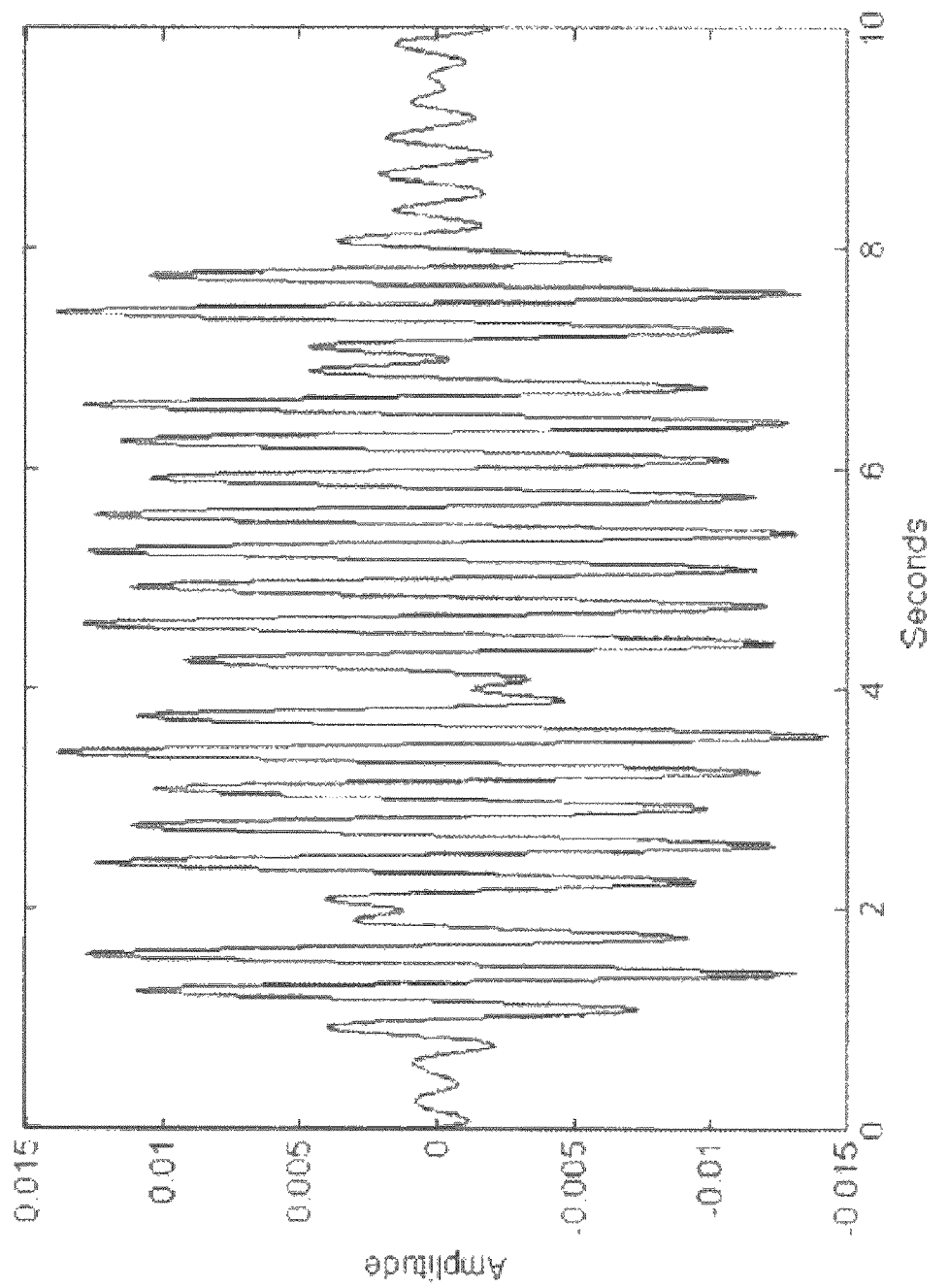

Referring now to FIG. 25(a), there is shown one embodiment of the method 2400 for transmitting a data frame of the EM telemetry signal. The embodiment shown in FIG. 25(a) can be implemented using the block diagram shown in FIG. 4 and results in the bitstream depicted in FIG. 22(a) being transmitted. The downhole processor 56 proceeds from step 2402 to step 2502a where it reads raw measurement data from the sensor modules 50,52 and encodes this raw data into an encoded digital bitstream in the form of the data frame to be transmitted (step 2504a; the bitstream that includes the data frame is hereinafter the "data bitstream"). At step 2506a the downhole processor 56 determines the ID, digitally encodes the ID as part of the data bitstream, and also determines the content of the long header and when to begin transmitting the long header and ID. In the bitstream of FIG. 22(a), the data frame is transmitted immediately following transmission of the ID. The ID is transmitted a short delay after completion of transmission of the current data frame. The processing power of the downhole processor 56 is typically limited; consequently, when the EM telemetry signal is sent to the downhole location, the short delay between the end of the one data frame and the start of transmission of the subsequent ID gives the downhole processor 56 sufficient processing time to identify the beginning of the ID. This short delay is typically not required when transmitting a signal to surface because surface processing equipment is considerably more powerful than the downhole processor 56; in an alternative embodiment (not depicted), the short delay may also be omitted when transmitting signals to a downhole location if the downhole processor 56 has sufficient processing power. In the embodiment of FIG. 25(*a*), the downhole processor 56 determines when the current data frame will end and schedules the ID to be transmitted on the data channel a short delay after the current data frame ends. The downhole processor 56 then determines, from the scheduled time that the ID is to start transmitting, when to begin transmitting the long header on the header channel by subtracting from the ID's start time the time it will take to transmit the long header. Commencing transmission of the long header at this time results in transmission of the ID beginning simultaneously with transmission of the long header completing. As shown in FIG. 22(*a*), this results in a portion of the long header being transmitted simultaneously with the current data frame. The header delay between the end of the current data frame and the start of the next data frame is accordingly reduced relative to that of FIG. 21(*b*).

Following determining when to transmit the long header and ID, at step 2508*a* the downhole processor 56 encodes the long header into a digital bitstream ("header bitstream") and converts the data bitstream and the header bitstream into a data waveform and a header waveform, respectively. This conversion involves using a selected digital modulation technique to modulate the waveforms, with the frequency of each waveform being modulated being determined in accordance with Equations (1) through (4). At step 2508*a*, the downhole processor 56 also digitally combines the data and header waveforms into a combined waveform. The downhole processor 56 then proceeds to step 2510*a* and generates control signals to the H-bridge circuit 106, voltage regulators 114, 116, and gap sub 12 to transmit an EM telemetry signal comprising the combined waveform (otherwise referred to as "carrier wave") across the gap sub 12. Following generation of the control signals, the appropriate voltages are applied across the gap sub 12 (step 2512*a*) and the EM signal is transmitted to the surface. Once received at the surface by the receiver 80, the EM signal may be demodulated in accordance with FIG. 7, as described above.

Various digital modulation techniques known in the art can be used to encode each separate waveform, such as ASK, PSK, FSK, BPSK, QPSK or any combination of these or other individual modulation techniques as is known in the art. As the frequencies of the separate waveforms are set at different values, the plurality of separate waveforms encoded by one or more of these techniques can be superimposed to form one combined waveform (carrier wave) for transmission to surface. As a result, one EM signal comprising the carrier wave composed of two or more telemetry channels can be transmitted to surface.

Referring now to FIG. 25(*b*), there is shown another embodiment of the method 2400 for transmitting a frame of the EM telemetry signal. As with the embodiment of FIG. 25(*a*), the embodiment of FIG. 25(*b*) can be implemented according to the block diagram of FIG. 4. Applying the embodiment of FIG. 25(*b*) results in the bitstream shown in FIG. 22(*b*) being transmitted.

As with the embodiment of FIG. 25(*a*), when performing the embodiment of FIG. 25(*b*) the downhole processor 56 moves to step 2502*b* from step 2402, reads raw measurement data, and then encodes the raw data into the data bitstream at step 2504*b*. As with the bitstream of FIG. 22(*a*), in the bitstream of FIG. 22(*b*) the data frame is transmitted immediately following transmission of the ID. The downhole processor 56 proceeds to step 2506*b* where it determines the content of the long header and when to begin transmitting the long header and ID. Unlike the bitstream of FIG. 22(*a*), in the bitstream of FIG. 22(*b*) the current data frame is interrupted by the ID; this could be done, for example, in response to a change from sliding to rotating drilling or in response to a tool malfunction. The downhole processor 56 determines a time at which to interrupt transmission of the current data frame with the transmission of the ID by determining when the next data packet in the current data frame ends; instead of then sending the subsequent data packet in the frame, the processor 56 sends the ID. The downhole processor 56 then determines, from the scheduled time that the ID is to start transmitting, when to begin transmitting the long header on the header channel by subtracting from the ID start time the time it will take to transmit the long header. Commencing transmission of the header at this time results in transmission of the ID beginning simultaneously with completion of transmission of the long header. As shown in FIG. 22(*b*), this results in the long header being transmitted simultaneously with the current data frame. The header delay between the end of the current data frame and the start of the next data frame is accordingly reduced relative to that of FIG. 21(*c*).

Following determining when to transmit the ID and long header, at step 2508*b* the downhole processor 56 generates the header bitstream, converts the data and header bitstreams into data and header waveforms, respectively, and combines the two waveforms, as is done at step 2508*a*. The downhole processor 56 then generates the control signals used for signal transmission and transmits the EM signal at steps 2510*b* and 2512*b*, as is done at steps 2510*a* and 2512*a*. Once received at the surface by the receiver 80, the EM signal may be demodulated in accordance with FIG. 7 as described above.

Referring now to FIG. 25(*c*), there is shown another embodiment of the method 2400 for transmitting a frame of the EM telemetry signal. As with the embodiment of FIG. 25(*a*), the embodiment of FIG. 25(*c*) can be implemented according to the block diagram of FIG. 4. Applying the embodiment of FIG. 25(*c*) results in the bitstream shown in FIG. 22(*c*) being transmitted.

As with the embodiment of FIG. 25(*a*), when performing the embodiment of FIG. 25(*c*) the downhole processor 56 proceeds to step 2502*c* from step 2402 where it reads raw measurement data. The downhole processor 56 then proceeds to step 2504*c* where it encodes the raw data into the data bitstream at step 2504*c*. As with the bitstream of FIG. 22(*a*), in the bitstream of FIG. 22(*c*) the data frame is transmitted immediately following transmission of the ID. At step 2506*c* the downhole processor 56 determines the content of the long header and when to begin transmitting the long header and ID. As in the bitstream of FIG. 22(*b*), in the bitstream of FIG. 22(*c*) transmission of the current data frame is interrupted by the ID. The downhole processor 56 determines a time at which to interrupt transmission of the current data frame with transmission of the ID. The downhole processor 56 schedules transmission of the long header and the ID to start simultaneously. As shown in FIG. 22(*c*), this results in the long header, ID, and data frame being transmitted simultaneously. The header delay between the two data frames is accordingly reduced relative to that of FIG. 21(*c*). Following signal transmission the downhole processor 56 proceeds to step 2408 where the method 2400 ends.

Following determining when to transmit the ID and long header, at step 2508*c* the downhole processor 56 generates the header bitstream, converts the data and long header bitstreams into data and header waveforms, respectively, and combines the two waveforms, as is done at step 2508a. The downhole processor 56 then generates the control signals used for signal transmission and transmits the EM signal at steps 2510c and 2512c, as is done at steps 2510a and 2512a. Once received at the surface by the receiver 80, the EM signal may be demodulated in accordance with FIG. 7 as described above. Following signal transmission the downhole processor 56 proceeds to step 2408 where the method 2400 ends. In the embodiment shown in FIG. 22(*c*), transmission of the long header is completed prior to completion of transmission of the data frame. Consequently, once the data frame has been transmitted, the receiver 80 has sufficient information to demodulate and use the data contained in the frame.

Referring now to FIG. 22(*d*), there is shown the header and data bitstreams transmitted along the header and data channels, according to another embodiment. The embodiment used to generate the bitstreams shown in FIG. 22(*d*) is identical to that used to generate the bitstreams shown in FIG. 22(*a*) except that the entire header portion is transmitted using the header channel in place of only the long header in FIG. 22(*a*). Consequently, only the data frame is transmitted using the data channel. The header portion completes transmission simultaneously with the data frame commencing transmission. As the data channel is used exclusively for data frames in FIG. 22(*d*), all other things being equal the effective data transfer rate of bitstreams shown in FIG. 22(*d*) is higher than that of FIG. 22(*a*). Although not depicted, the long header and ID can be combined in the bitstreams shown in FIGS. 22(*b*) and (*c*) as well in an analogous manner such that instead of only the long header being transmitted on the header channel, the long header and ID are transmitted on the header channels.

Referring now to FIGS. 26(*a*)-(*f*), there are shown examples of waveforms generated and recovered by the EM telemetry system 30, in accordance with the embodiment of FIG. 25(*a*). FIG. 26(*a*) shows the data waveform modulated using BPSK having a carrier frequency of six Hz and with the ID and data frame encoded at three cycles/bit. FIG. 26(*b*) shows the header waveform also modulated using BPSK having a carrier frequency of three Hz and with the header encoded at three cycles/bit. FIG. 26(*c*) shows the combined waveform resulting from the superposition of the data and header waveforms. It is the combined waveform that is transmitted through the earth and that is received by the receiver 80. The combined waveform as received by the receiver 80 is shown in FIG. 26(*d*). Following filtering and other signal conditioning as described above in respect of FIG. 7, the data waveform is recovered as shown in FIG. 26(*e*) and the header waveform is recovered as shown in FIG. 26(*f*).

Using multiple channels to transmit frames can be used, for example, during LWD when measurements are typically sent a certain number of times per foot drilled. If, for example, the EM signal transmitter 13 is transmitting two frames per foot drilled, it takes twenty seconds to transmit the header, and drilling is occurring at the rate of one foot every twenty seconds, then measurement data cannot be sent in real time to the receiver 80 while drilling is occurring. However, the data transfer rate can be increased by sending the long header on a separate channel from the data frame, which allows the long header to be shortened and the long headers and data frames to be transmitted simultaneously.

Figure 24B:
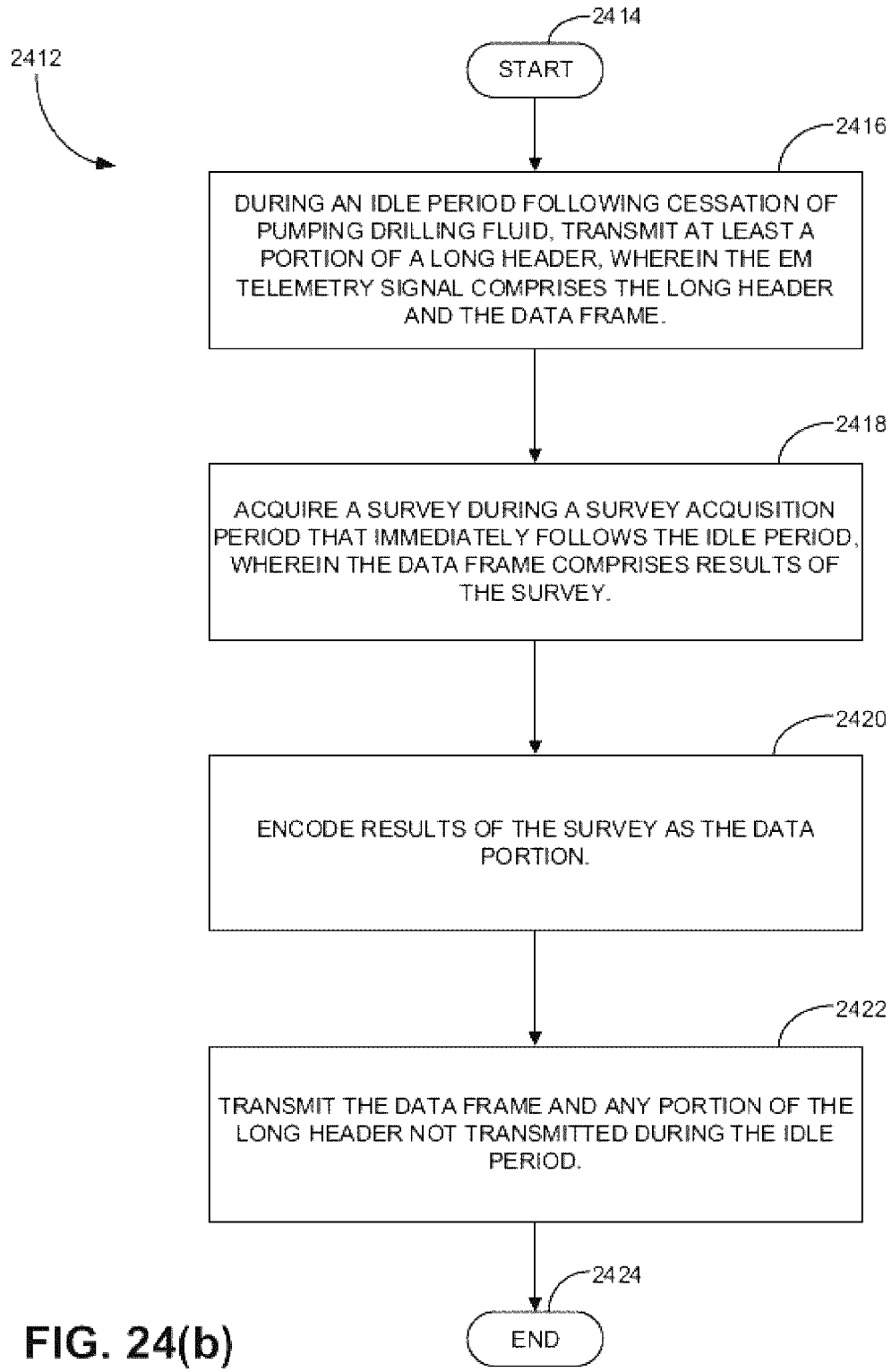

In another embodiment, the downhole processor 56 can take advantage of idle periods to transfer data, as illustrated using FIGS. 23(*a*)-(*c*) and in accordance with a method 2412 shown in FIG. 24(*b*). FIG. 23(*a*) shows a graph of mud being pumped downhole vs. time. Prior to $t_0$, mud is pumped downhole at a constant rate. From $t_0$ to $t_1$, mud flow ceases and the BHA does not perform a survey; this period during which no mud is pumped and no survey is performed is referred to as an "idle period", which is a period during which vibration is allowed to dampen so as not to interfere with surveying. A typical duration for the idle period is approximately thirty seconds. A conventionally configured downhole processor 56 does not transmit any signals to surface during the idle period; this is illustrated in FIG. 23(*b*). Following the idle period, from $t_1$ to $t_2$ in FIG. 23(*b*), the BHA acquires a survey; this period is accordingly referred to as a "survey acquisition period". A conventionally configured downhole processor 56 begins transmitting the frame after the survey acquisition period, also as shown in FIG. 23(*b*). Following the survey acquisition period mud pumping restarts.

Referring now in particular to the method 2412 of FIG. 24(*b*) and bitstreams (i) and (ii) of FIG. 23(*c*), the downhole processor 56 according to one embodiment may commence transmitting during the idle period, thereby transmitting the data acquired during the survey more quickly than when this data is conventionally sent, as depicted in FIG. 23(*b*). The method 2412 of FIG. 24(*b*) transmits a data frame of the EM telemetry signal from a downhole location to surface. The downhole processor 56 begins performing the method 2412 at step 2414, following which it proceeds to step 2416 where it transmits at least part of the long header of the EM telemetry signal during the idle period. This is illustrated in waveform (i) of FIG. 23(*c*) when only the long header is transmitted during the idle period, and in waveform (ii) of FIG. 23(*c*) when the entire header portion (i.e., the long header and the ID) is transmitted during the idle period. The downhole processor 56 determines when to begin transmitting the long header by subtracting from $t_2$ the time it will take to transmit the long header (for waveform (i)) or the entire header portion (for waveform (ii)). Following transmission of the long header (for waveform (i)) or the header portion (for waveform (ii)), the downhole processor proceeds to step 2418 where it acquires a survey during the survey acquisition period, which immediately follows the idle period. As the survey is being acquired, the downhole processor 56 encodes the results of the survey into the data frame at step 2420. The downhole processor 56 then proceeds to step 2422 where it transmits the data frame and any portion of the long header not transmitted during the idle period; in FIG. 23(*c*), only the data frame is transmitted to the surface following the survey acquisition period. Following transmission, the processor 56 proceeds to step 2424 where the method 2412 ends.

The controller used in the foregoing embodiments may be, for example, a microprocessor, microcontroller, digital signal processor, programmable logic controller, field programmable gate array, or an application-specific integrated circuit. Examples of the computer readable medium are non-transitory and include disc-based media such as CD-ROMs and DVDs, magnetic media such as hard drives and other forms of magnetic disk storage, semiconductor based media such as flash media, random access memory, and read only memory.

It is contemplated that any part of any aspect or embodiment discussed in this specification can be implemented or combined with any part of any other aspect or embodiment discussed in this specification.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for transmitting electromagnetic (EM) telemetry signal from an EM transmitter at a downhole location to an EM receiver at a surface location, the method being performed during a drilling operation being carried out by a drilling rig comprising one or more pumps configured to pump a drilling fluid for use during the drilling operation, wherein the EM telemetry signal comprises a long header and a data frame, the long header allowing synchronization of communications between the EM transmitter and the EM receiver, and wherein the method comprises:
   (a) deactivating the one or more pumps so as to cease pumping of the drilling fluid;
   (b) during an idle period following the cessation of the pumping of the drilling fluid, transmitting from the EM transmitter at least a portion of the long header, wherein during the idle period the one or more pumps are not activated such that the drilling fluid is not being pumped;
   (c) acquiring a survey during a survey acquisition period that immediately follows the idle period;
   (d) encoding results of the survey as the data frame;
   (e) reactivating the one or more pumps, after the encoding of the results of the survey, so as to reinitiate the pumping of the drilling fluid; and
   (f) transmitting from the EM transmitter, after the idle period and after the reinitiating of the pumping of the drilling fluid, the data frame and any remaining portion of the long header not transmitted during the idle period.

2. The method of claim 1 further comprising transmitting an identifier (ID), which varies with the content of the data frame.

3. The method of claim 2 wherein all of the long header is transmitted during the idle period.

4. The method of claim 3 wherein all of the ID is transmitted during the idle period.

5. A non-transitory computer readable medium having encoded thereon statements and instructions to cause a processor to perform a method for transmitting an electromagnetic (EM) telemetry signal from an EM transmitter at a downhole location to an EM receiver at a surface location, the method being performed during a drilling operation being carried out by a drilling rig comprising one or more pumps configured to pump a drilling fluid for use during the drilling operation, wherein the EM telemetry signal comprises a long header and a data frame, the long header allowing synchronization of communications between the EM transmitter and the EM receiver, and wherein the method comprises:
   (a) deactivating the one or more pumps so as to cease the pumping of the drilling fluid;
   (b) during an idle period following the ceasing of the pumping of the drilling fluid, transmitting from the EM transmitter at least a portion of the long header, wherein during the idle period the one or more pumps are not activated such that the drilling fluid is not being pumped;
   (c) acquiring a survey during a survey acquisition period that immediately follows the idle period;
   (d) encoding results of the survey as the data frame;
   (e) reactivating the one or more pumps, after the encoding of the results of the survey, so as to reinitiate the pumping of the drilling fluid; and
   (f) transmitting from the EM transmitter, after the idle period and after the reinitiating of the pumping of the drilling fluid, the data frame and any remaining portion of the long header not transmitted during the idle period.

6. The non-transitory computer readable medium of claim 5 further comprising statements and instructions executable by the processor to transmit an identifier (ID), which varies with the content of the data frame.

7. The non-transitory computer readable medium of claim 6 wherein in the method, all of the long header is transmitted during the idle period.

8. The non-transitory computer readable medium of claim 7 wherein in the method, all of the ID is transmitted during the idle period.

9. A downhole telemetry tool for transmitting an electromagnetic (EM) telemetry signal from an EM transmitter at a downhole location to an EM receiver at a surface location, wherein the EM telemetry signal comprises a long header and a data frame, the long header allowing synchronization of communications between the EM transmitter and the EM receiver, the tool comprising:
   (a) a gap sub assembly;
   (b) an EM carrier frequency signal generator for generating an EM carrier wave across an electrically isolated gap of the gap sub assembly; and
   (c) an electronics subassembly communicative with the signal generator and comprising a downhole processor and a memory containing an encoder program code executable by the downhole processor to perform a method during a drilling operation being carried out by a drilling rig comprising one or more pumps configured to pump a drilling fluid for use during the drilling operation, the method comprising:
      (i) activating the one or more pumps so as to cease pumping of the drilling fluid;
      (ii) during an idle period following the ceasing of the pumping of the drilling fluid, transmitting from the EM transmitter at least a portion of the long header, wherein during the idle period the one or more pumps are not activated such that the drilling fluid is not being pumped;
      (iii) acquiring a survey during a survey acquisition period that immediately follows the idle period;
      (iv) encoding results of the survey as the data frame;
      (v) reactivating the one or more pumps, after the encoding of the results of the survey, so as to reinitiate the pumping of the drilling fluid; and
      (vi) transmitting from the EM transmitter, after the idle period and after the reinitiating of the pumping of the drilling fluid, the data frame and any remaining portion of the long header not transmitted during the idle period.

10. The downhole telemetry tool of claim 9 wherein the encoder program code is further executable by the processor to transmit an identifier (ID), which varies with the content of the data frame.

11. The downhole telemetry tool of claim 10 wherein in the method all of the long header is transmitted during the idle period.

12. The downhole telemetry tool of claim 11 wherein in the method all of the ID is transmitted during the idle period.

* * * * *